(12) United States Patent
Stockmaster

(10) Patent No.: US 7,778,367 B1
(45) Date of Patent: Aug. 17, 2010

(54) METHOD AND APPARATUS FOR RECEIVING A GEO-LOCATION SIGNAL

(75) Inventor: Michael H. Stockmaster, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1163 days.

(21) Appl. No.: 11/234,660

(22) Filed: Sep. 23, 2005

(51) Int. Cl.
*H04B 7/10* (2006.01)

(52) U.S. Cl. .................. 375/347; 375/240.19; 375/350; 375/267

(58) Field of Classification Search .................. 375/347, 375/144
See application file for complete search history.

(56) References Cited

U.S. PATENT DOCUMENTS

| | | | | |
|---|---|---|---|---|
| 4,852,161 A * | 7/1989 | Hagiwara | ............... | 379/406.05 |
| 5,757,309 A * | 5/1998 | Brooks et al. | ................. | 342/90 |
| 6,292,592 B1 * | 9/2001 | Braunreiter et al. | ......... | 382/240 |
| 6,310,957 B1 * | 10/2001 | Heller et al. | ................. | 380/236 |
| 6,424,986 B1 * | 7/2002 | Li et al. | ...................... | 708/400 |
| 6,611,627 B1 * | 8/2003 | LaRossa et al. | ............. | 382/240 |
| 7,130,749 B2 * | 10/2006 | Wills et al. | ..................... | 702/58 |
| 2006/0245500 A1 * | 11/2006 | Yonovitz | ............... | 375/240.19 |

* cited by examiner

*Primary Examiner*—Shuwang Liu
*Assistant Examiner*—Lihong Yu
(74) *Attorney, Agent, or Firm*—Matthew J. Evans; Daniel M. Barbieri

(57) ABSTRACT

A method and apparatus for receiving geolocation signals wherein the geolocation signals are received by receiving a plurality of perspectives of a geolocation signal and a jamming signal; generating a plurality of wavelet transformations corresponding to the plurality of perspectives; determining a covariance between corresponding elements in the plurality of wavelet transformations; weighting each element in each wavelet transformation by weights derived from the determined covariance; generating a nulled wavelet transformation by summing together corresponding weighted elements from each of the plurality of wavelet transformations; and generating a time-domain rendition of the geolocation signal according to the nulled wavelet transformation through use of the inverse wavelet transform.

20 Claims, 23 Drawing Sheets

US 7,778,367 B1

METHOD AND APPARATUS FOR RECEIVING A GEO-LOCATION SIGNAL

BACKGROUND

A well-known anti jamming technique useful in attenuating the influence of a jamming signal when determining geolocation is known as space frequency adaptive processing (SFAP). Space frequency adaptive processing works to eliminate a jamming signal in both a spatial domain and a frequency domain. Such techniques rely on Fourier transformations in order to determine frequency domain information.

Space frequency adaptive processing works well when there is a stable jamming signal. However, if the frequency of a jamming signal changes or if its amplitude pulses over the course of a block of anti jam processing, the space frequency adaptive processing algorithms will not be as effective as they otherwise could be.

When the frequency of a jamming signal changes, for example when the jamming signal sweeps across a given frequency band, the bandwidth of the jamming signal appears to be greater than it really is. For example, if, over the course of a block of processing, the frequency of the jamming signal changes from 0 Hz to a Nyquist rate, the jamming signal would appear to be a broadband, low power signal. This would force the use of a broadband spatial null in the anti jam processing instead of a localized elimination of the jamming signal at a particular frequency at that same spatial location. This reduces the ability of the anti jamming system to attenuate the effects of a jamming signal and results in increased signal distortion.

Similarly, when a jamming signal is pulsed on and off, an anti jamming system may be forced to assume that a jamming signal is present during an entire block of anti-jam processing. This, too, results in sub-optimal anti jamming performance. This is because the weighting factors that are used to counter the jamming signal that are applied to various spatial perspectives of a signal at different frequencies will be constant. This results in attenuation at a consistent level even though the jamming signal is not present at all such spatial-frequency combinations.

BRIEF DESCRIPTION OF THE DRAWINGS

The present invention will hereinafter be described in conjunction with the appended drawings and figures, wherein like numerals denote like elements, and in which.

DETAILED DESCRIPTION

Figure 1:
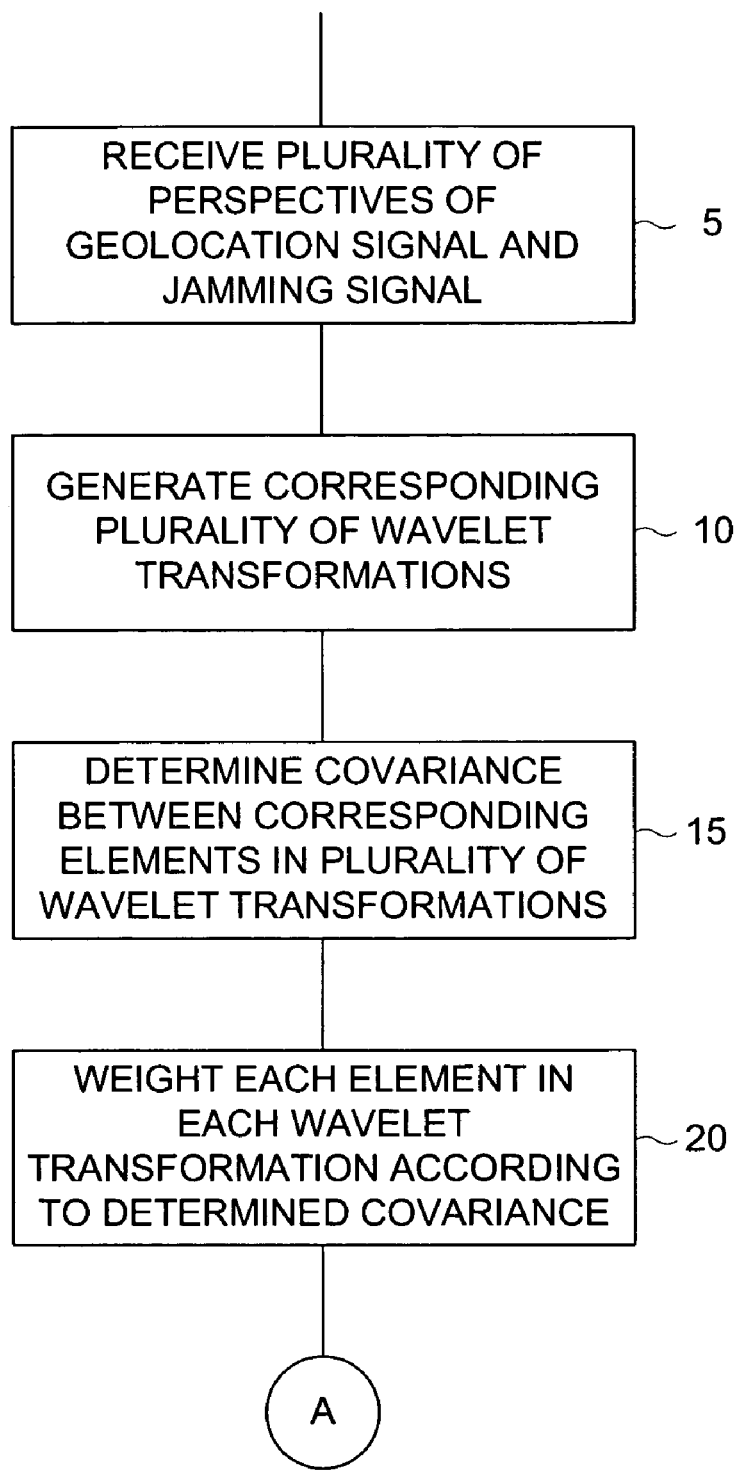
FIGS. 1 and 2 collectively form a flow diagram that depicts one example method for receiving geolocation signals.
Figure 2:
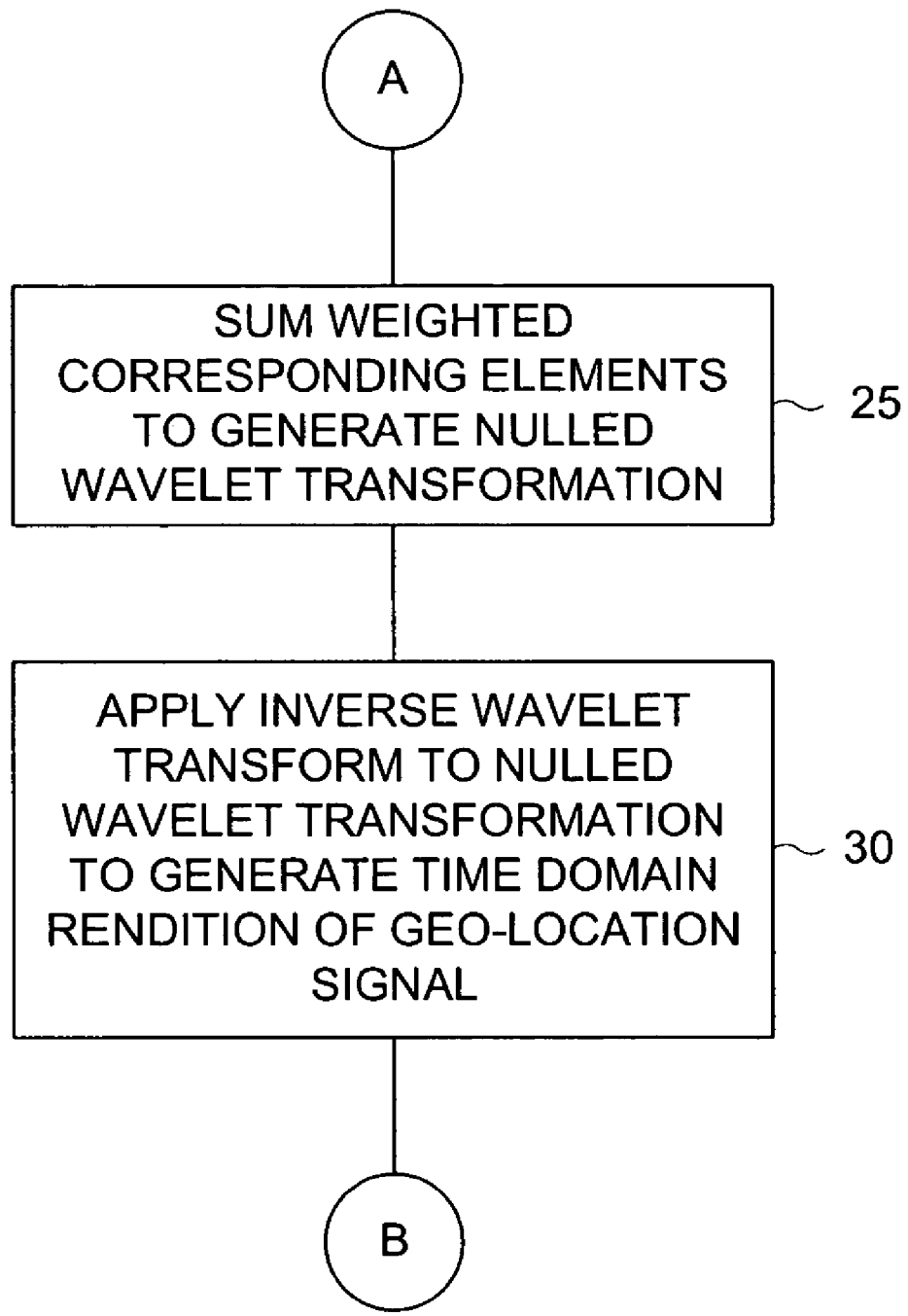

FIGS. 1 and 2 collectively form a flow diagram that depicts one example method for receiving geolocation signals. According to this example method, geolocation signals are received by receiving a plurality of perspectives of a geolocation signal and a jamming signal (step 5). Once a plurality of perspectives of a geolocation signal are received along with a jamming signal, a corresponding plurality of wavelet transformations are then generated (step 10). Based on the plurality of wavelet transformations, a covariance matrix is generated. It should be appreciated that the covariance matrix is generated by determining a covariance between corresponding elements in each of the plurality of wavelet transformations (step 15). The covariance matrix is then used to generate a set of weights. The set of weights is then used to weight each element in each wavelet transformation (step 20).

Once each element in each wavelet transformation is weighted, the wavelet transformations (weighted) are then summed together on an element by element basis (step 25). This results in a "nulled" wavelet transformation. The nulled wavelet transformation is then subjected to an inverse wavelet transformation in order to generate a time-domain rendition of a geolocation signal (step 30). Accordingly, the time-domain rendition of the geolocation signal will exhibit an attenuated jamming signal.

Figure 3:
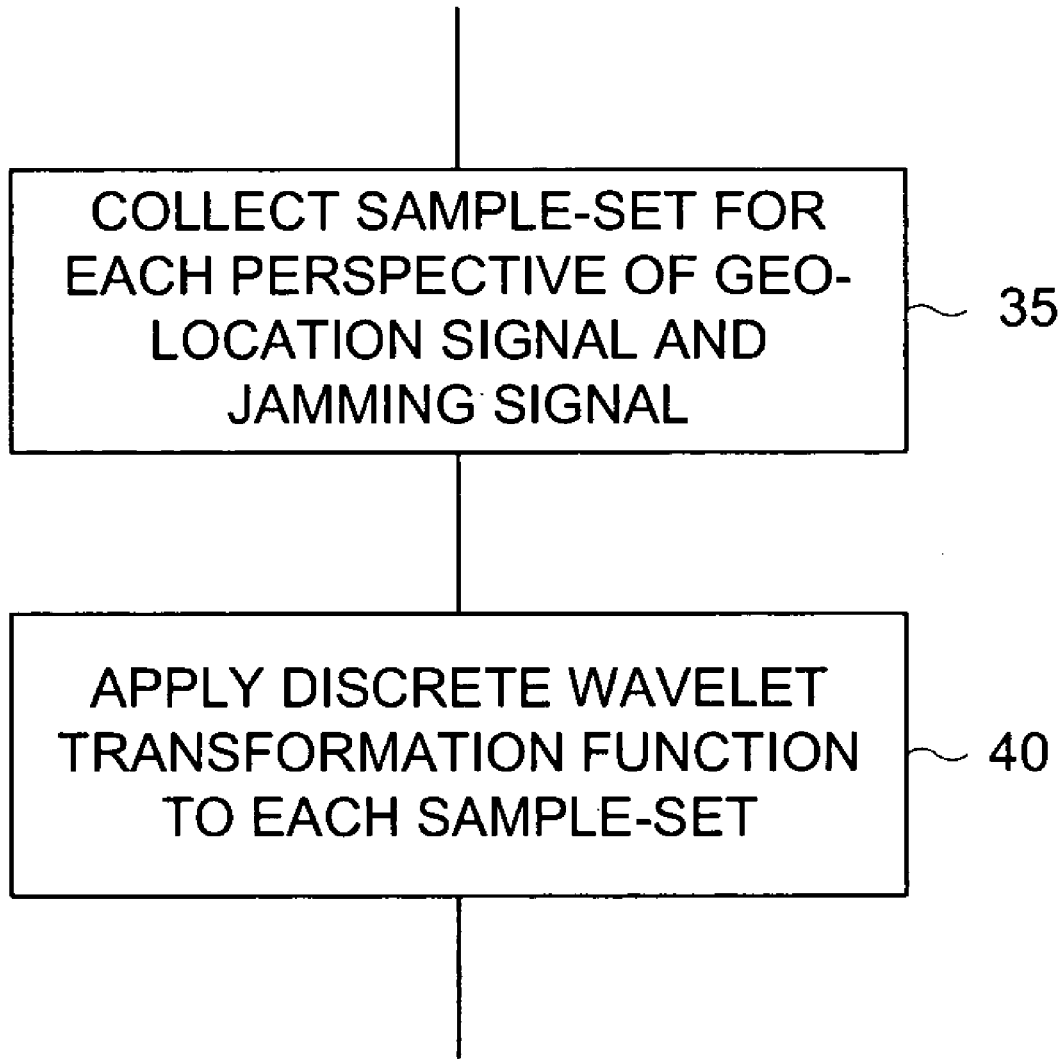
FIG. 3 is a flow diagram that depicts one example method for generating a plurality of wavelet transformations.

FIG. 3 is a flow diagram that depicts one example method for generating a plurality of wavelet transformations. According to this example variation of the present method, the plurality of wavelet transformations is generated by collecting a sample set for each perspective of a geolocation signal and a jamming signal (step 35). It should be appreciated that, in modern geolocation systems, a perspective is obtained from a particular antenna element, wherein the antenna element is typically included in a phased array of such antenna elements. Once a sample set is obtained for each of a plurality of perspectives (e.g. from each antenna element in a phased array), a discrete wavelet transformation is then applied to each sample set (step 40). This results in a plurality of wavelet transformations, each corresponding to a particular perspective of a geolocation signal and a jamming signal.

Figure 4:
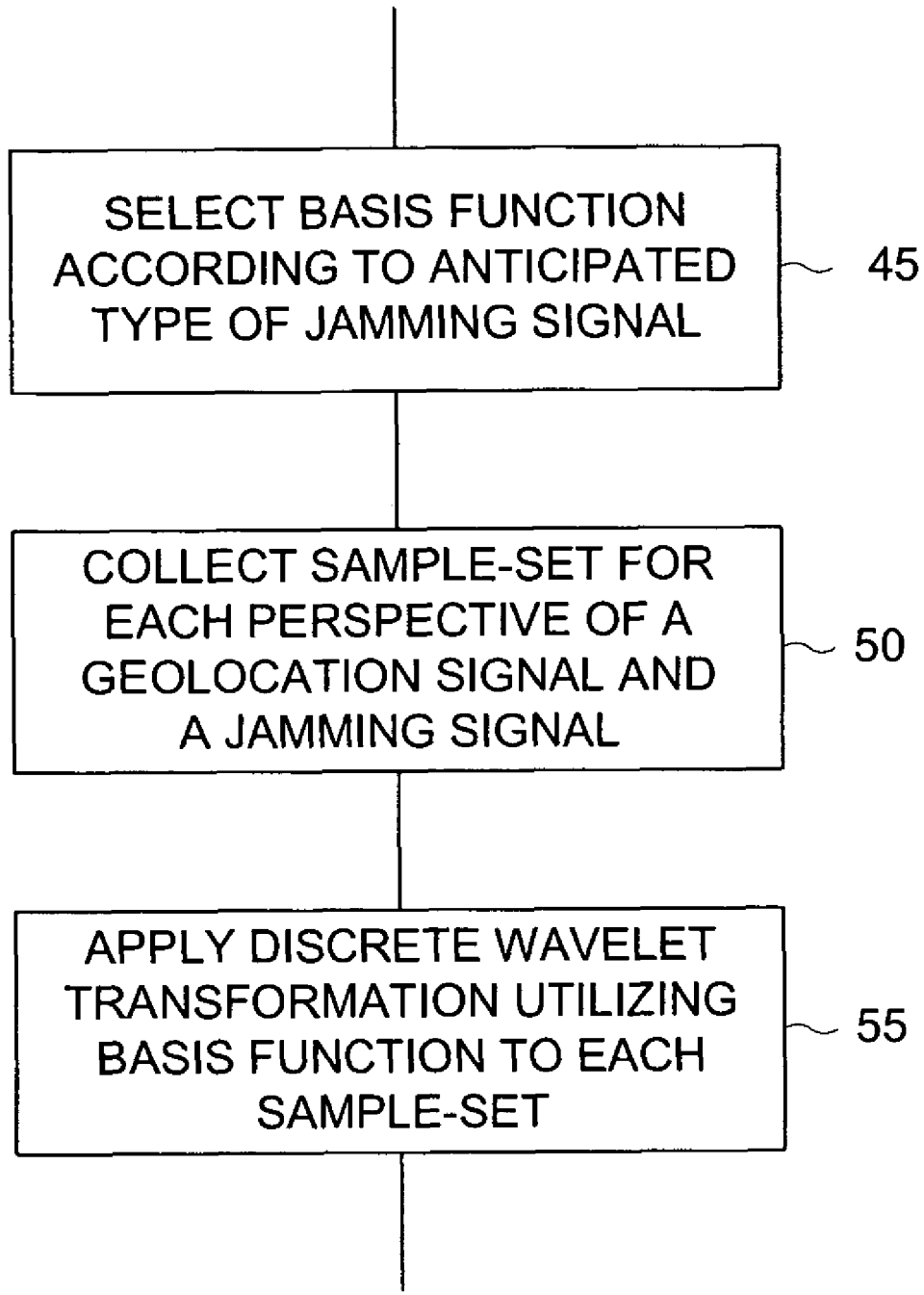
FIG. 4 is a flow diagram that depicts an alternative example method for generating a plurality of wavelet transformations according to a selected basis function.

FIG. 4 is a flow diagram that depicts an alternative example method for generating a plurality of wavelet transformations according to a selected basis function. It should be appreciated that, in contrast to prior art methods which relied upon a Fourier transformation, a wavelet transformation is generally accomplished according to a basis function. Where a Fourier transform generates a frequency domain rendition of a signal, a wavelet transformation generates a frequency vs. time-interval rendition of a signal. As such, a particular basis function may, according to one example, define a particular number of frequencies over a particular period of time. Yet another example of a basis function may require a wavelet transformation to convert a time domain rendition of a signal into a frequency vs. time-interval rendition of a signal, wherein a particular frequency may span a different time-interval then a different frequency. With such control over the wavelet transformation, a jamming signal that occupies a particular band over a particular interval of time can be anticipated. Accordingly, this variation of the present method provides for selecting a basis function according to an anticipated jamming signal (step 45). Once a basis function is selected, a sample set for each perspective of a geolocation signal and a jamming signal is collected (step 50). A discrete wavelet transformation is then applied to each sample set, wherein the wavelet transformation is performed according to the selected basis function (step 55). This results in a plurality of wavelet transformations, each corresponding to a sample set for a particular perspective of a geolocation signal and a jamming signal.

Figure 5:
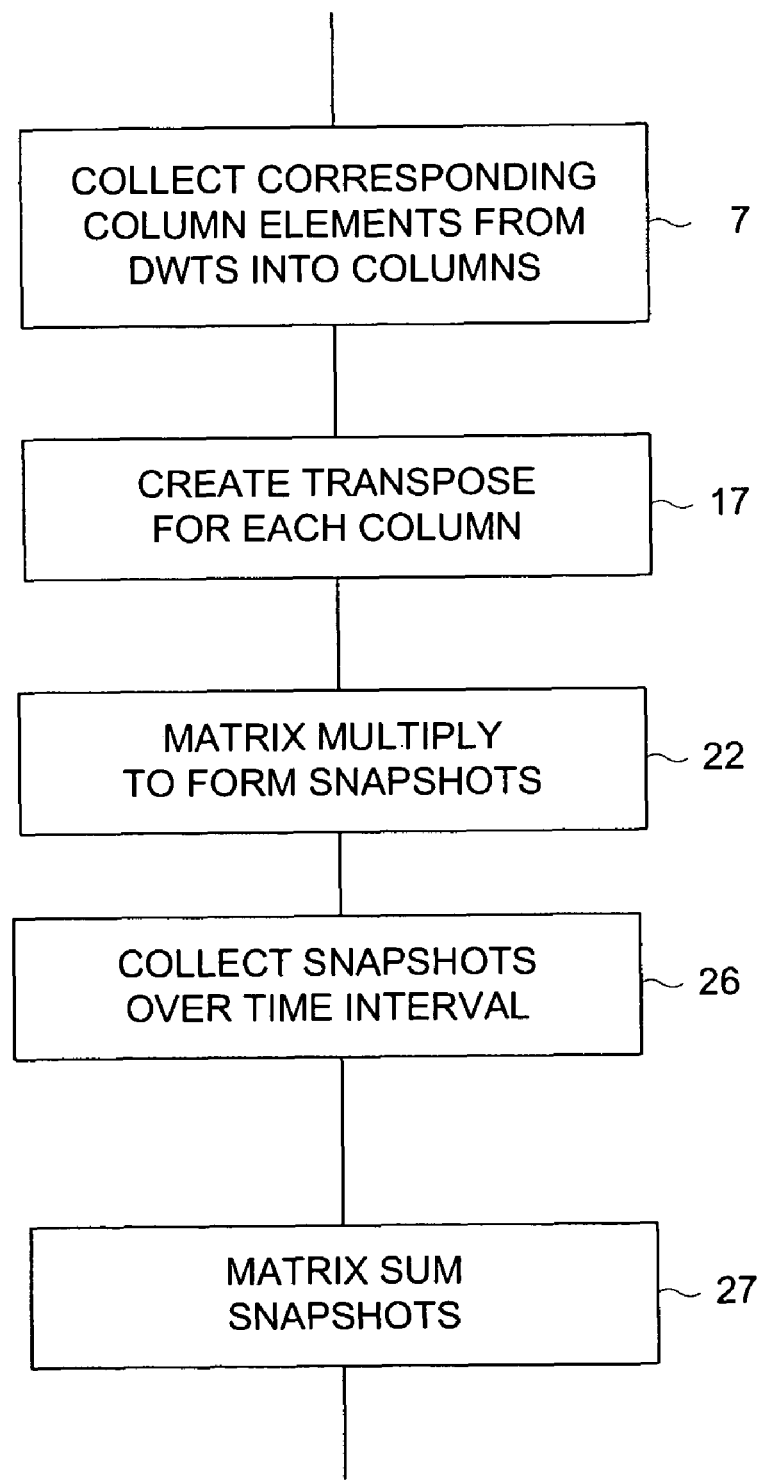
FIGS. 5 and 6 collectively comprise a flow diagram that depicts one example method for generating a covariance and a pictorial representation of the example method, respectively.
Figure 6:
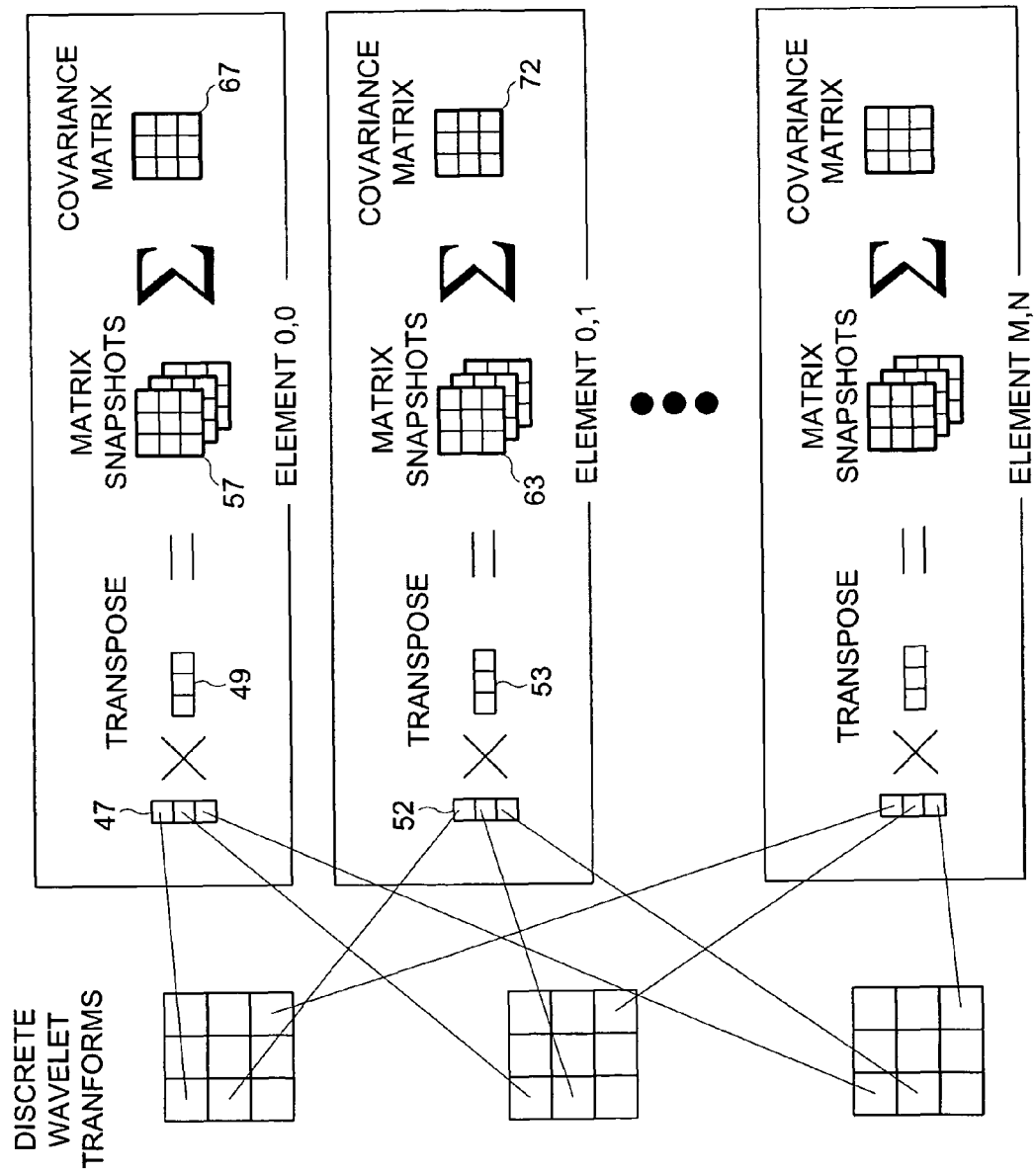

FIGS. 5 and 6 collectively comprise a flow diagram that depicts one example method for generating a covariance and a pictorial representation of the example method, respectively. According to this example method, a covariance is generated by collecting values into a column of elements from a plurality of wavelet transformations (step 7). As seen in FIG. 6, a first column of elements 47 is collected from corresponding elements from a plurality of discrete wavelet transformations. It should be appreciated that FIG. 6 depicts a 3 by 3 discrete wavelet transformation, but this is only an example and is not intended to limit the scope of the claims appended hereto. It should also be appreciated that a discrete wavelet transformation need not necessarily be structured in a uniform manner. That is to say, some elements may represent a different span of frequency or time than do other elements in the discrete wavelet transformation.

It should likewise be appreciated, as depicted in FIG. 6, that a second column 52 is collected from a second set of corresponding elements from a plurality of discrete wavelet transformations. As such, a distinct column is gathered for each element in the discrete wavelet transformations (through the Nth column and Mth row).

Once a plurality of columns of discrete wavelet transformation elements are collected, a series of transposed rows (49, 53) are then generated (step 17). The collected columns are then matrix multiplied by their transpositions in order to yield a matrix snapshot (57, 63) (step 22). This process is repeated over an interval of time, resulting in a plurality of matrix snapshots for each element in the discrete wavelet transforms. The resulting snapshots are then matrix summed together (step 27) in order form a covariance matrix (67, 72) for each element in a discrete wavelet transform. In order to generate weights, one alternative variation of the present method provides for multiplying the covariance matrix for each element (i.e. a time-frequency bin) by a steering vector. The method depicted here is only one example of a means for generating a covariance matrix and the claims appended hereto are not to be limited in scope to this example embodiment of a covariance matrix generation method.

Figure 7:
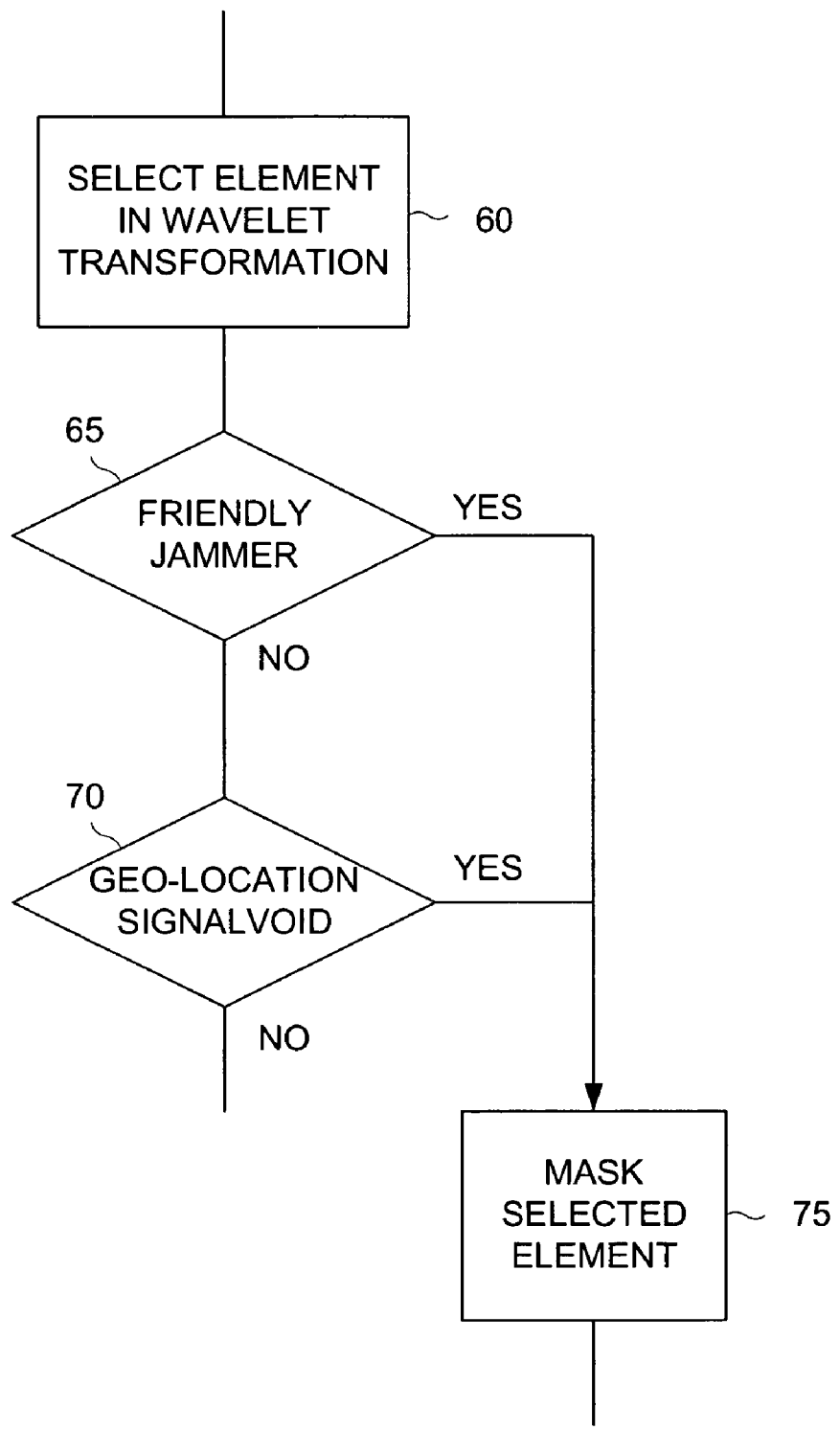
FIG. 7 is a flow diagram that depicts alternative example methods for weighting an element in a wavelet transformation.

FIG. 7 is a flow diagram that depicts alternative example methods for weighting an element in a wavelet transformation. It should be appreciated that certain elements in a wavelet transformation may correspond to either of a friendly jammer and a geolocation signal void. Accordingly, this variation of the present method provides for selecting an element in a wavelet transformation (step 60). The selected wavelet element is then identified either as a friendly jammer (step 65) or a geolocation signal void (step 70). In either case, the selected wavelet transformation element is then masked (step 75). By masking the element, the element will not be reflected in a resulting time-domain rendition of a geolocation signal.

Figure 8:
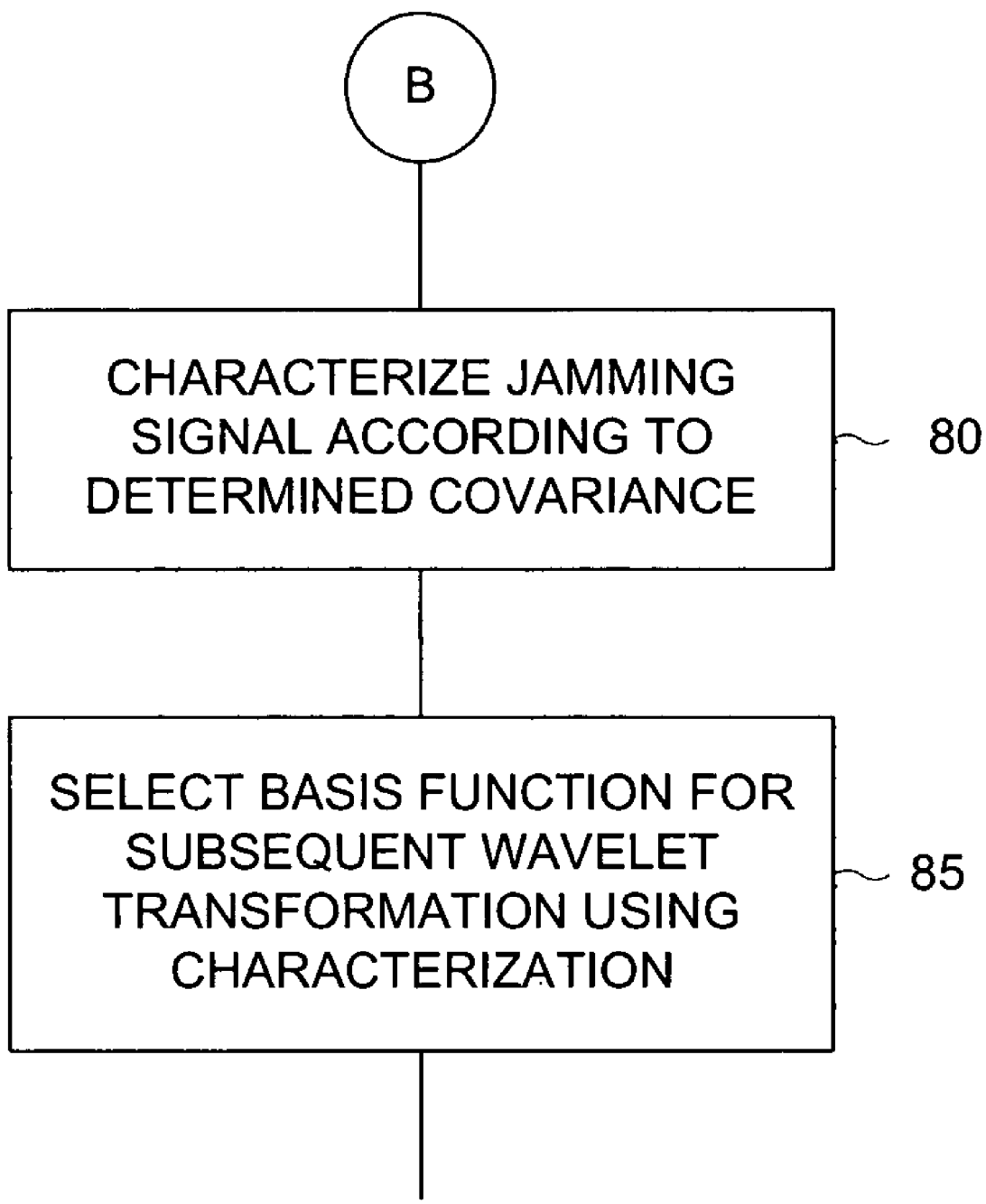
FIG. 8 is a flow diagram that depicts an alternative example method wherein a basis function is selected according to a characterization of a potential jamming signal.

FIG. 8 is a flow diagram that depicts an alternative example method wherein a basis function is selected according to a characterization of a potential jamming signal. It should be appreciated that, according to this variation of the present method, a jamming signal can be characterized according to a covariance determined for corresponding elements found in a plurality of wavelet transformations. Accordingly, this variation of the present method provides for characterizing a jamming signal according to a determined covariance (step 80). A basis function is then selected for a subsequent wavelet transformation (step 85) wherein the basis function is selected according to a characterization of the jamming signal based on the determined covariance.

Figure 9:
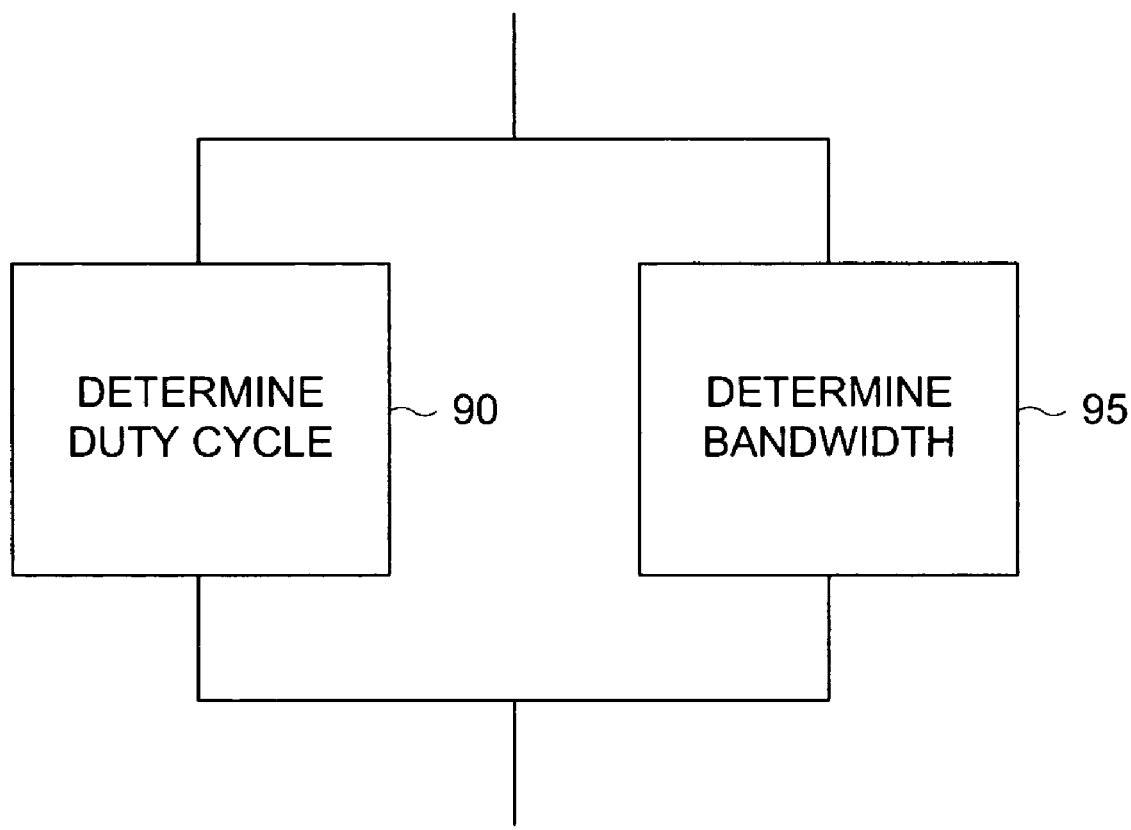
FIG. 9 is a flow diagram that depicts alternative example methods for characterizing a jamming signal.

FIG. 9 is a flow diagram that depicts alternative example methods for characterizing a jamming signal. It should be appreciated that, according to one example variation of the present method, a jamming signal is characterized by determining a duty cycle for the jamming signal (step 90). In one variation of the present method, determining a duty cycle comprises identifying a particular jamming signal that exists in contiguous "time bins" in a wavelet transformation as will be further discuss infra. In yet another variation of the present method, characterizing a jamming signal comprises determining a bandwidth for the jamming signal (step 95). It should be appreciated that this, according to yet another variation of the present method, is accomplished by identifying a jamming signal that is represented in contiguous "frequency bins" in a wavelet transformation as will be discussed further herein. It should be appreciated that yet another variation of the present method provides for determining both a duty cycle and a bandwidth as a means for characterizing a jamming signal.

Figure 10:
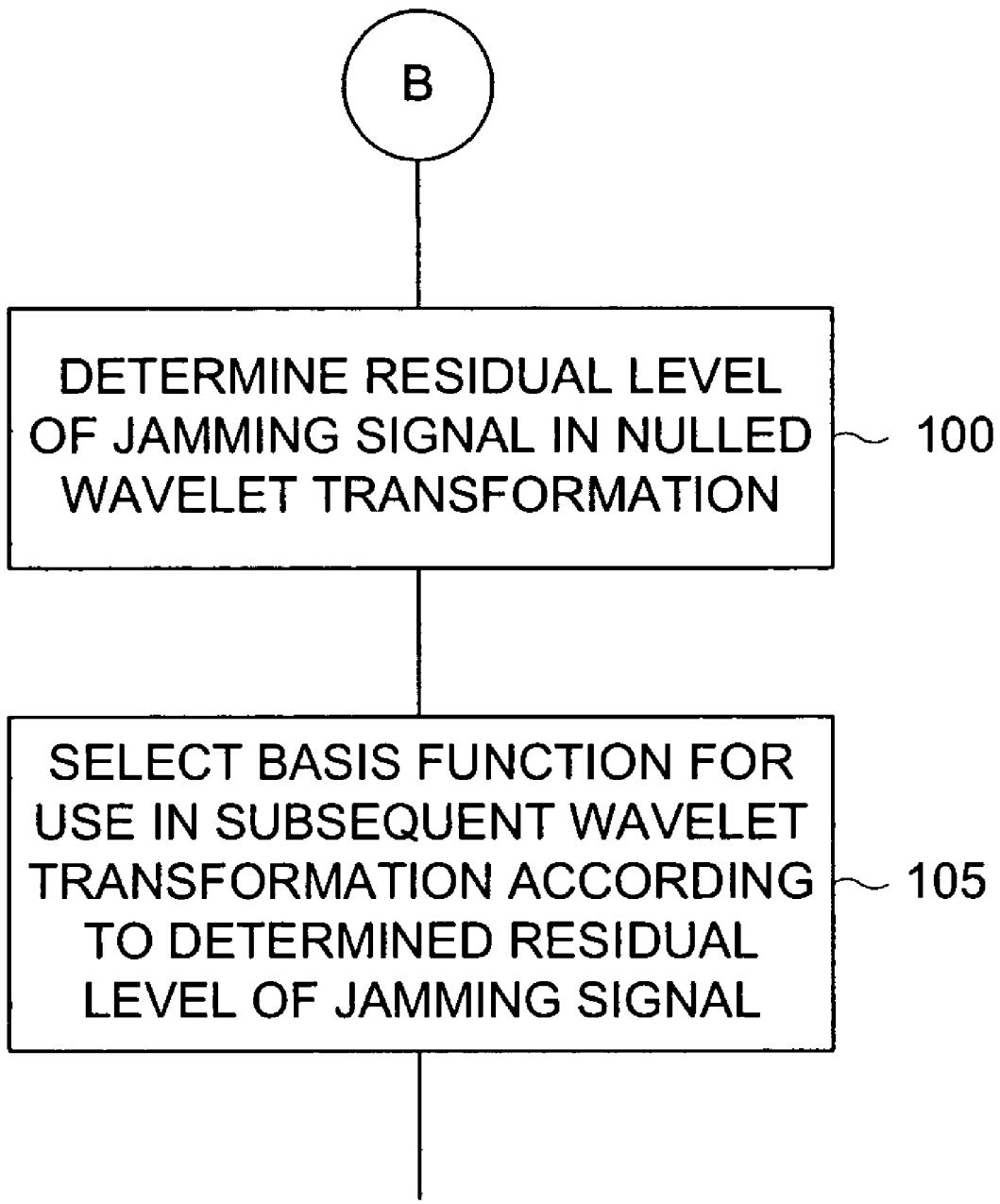
FIG. 10 is a flow diagram that depicts an alternative method wherein a residual level of a jamming signal is used to select a basis function.

FIG. 10 is a flow diagram that depicts an alternative method wherein a residual level of a jamming signal is used to select a basis function. It should be appreciated that the results of the method herein described is that of reducing or eliminating a jamming signal that is reflected a plurality of resulting time-domain perspectives of a geolocation signal. Accordingly, the amount of jamming signal attenuation can be used as one indicator of how well the jamming signal is being rejected. Accordingly, one variation of the present method provides for determining a residual level of a jamming signal (step 100). This is accomplished by determining a residual level of a jamming signal as exhibited in a nulled wavelet transformation. Based on the amount of residual jamming signal found in the nulled wavelet transformation, a basis function is selected (step 105). The selected basis function is then used in a subsequent wavelet transformation in hopes of further improving the performance of jamming signal attenuation.

Figure 11:
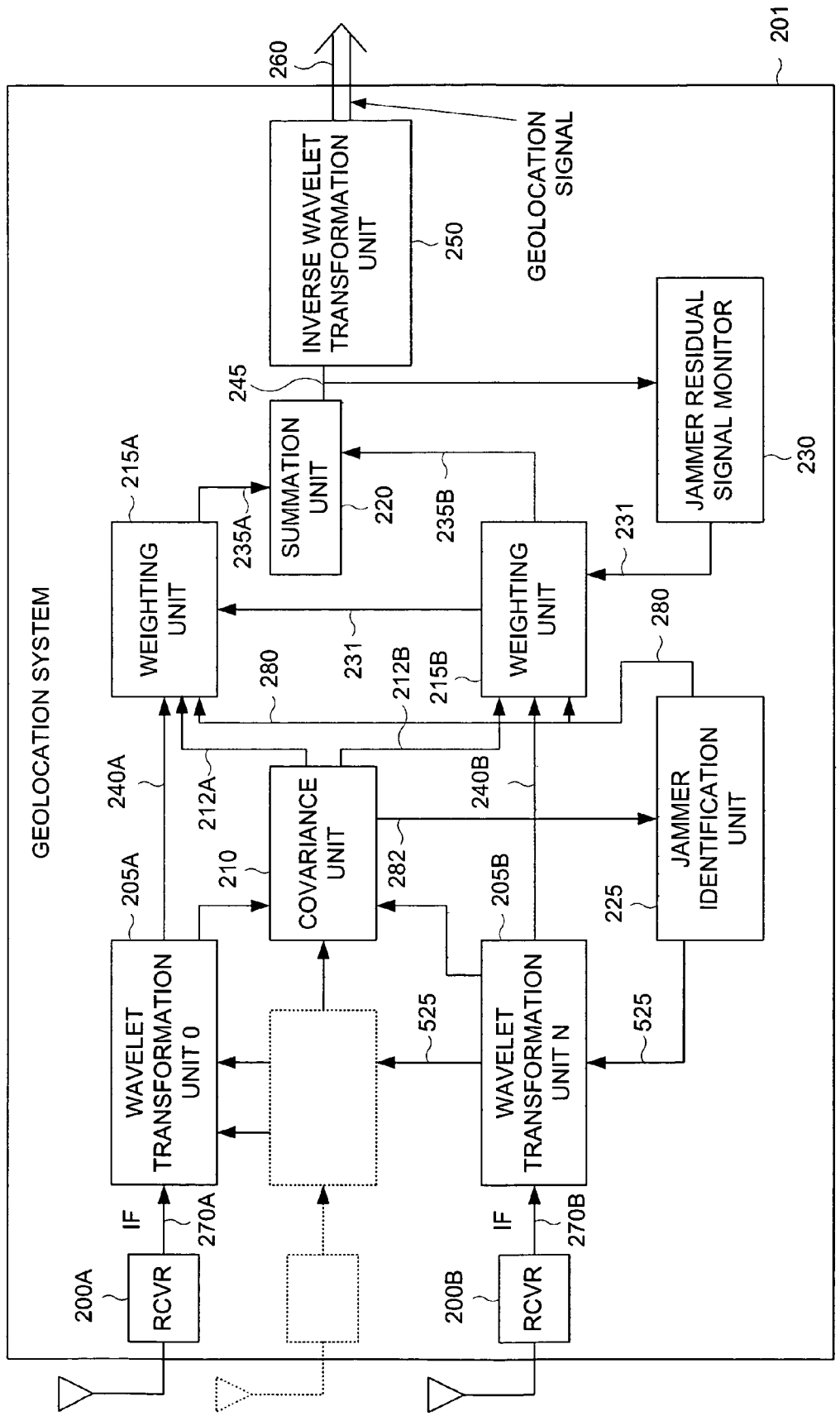
FIG. 11 is a block diagram that depicts several alternative example embodiments of a geolocation system.

FIG. 11 is a block diagram that depicts several alternative example embodiments of a geolocation system. According to one example embodiment, a geolocation system 201 comprises a plurality of signal receivers (200A, 200B), a plurality of wavelet transformation units (205A, 205B), a covariance unit 210, a plurality of weighting units (215A, 215B), a summation unit 220 and an inverse wavelet transformation unit 250. In operation, each signal receiver 200 receives a particular perspective of at least one of a geolocation signal and a jamming signal. Accordingly, a plurality of geolocation/jamming signal perspectives are generated as intermediate frequencies (IF) (270A, 270B). An intermediate frequency 270 generated by a signal receiver 200 is directed to a corresponding wavelet transformation unit 205. Each wavelet transformation unit 205 generates a wavelet transformation according to a signal received from its corresponding signal receiver 200. The covariance unit 210 generates a covariance matrix for each element in each wavelet transformation received from the plurality of wavelet transformation units (205A, 205B). The wavelet transformations generated by the wavelet transformation units are presented to corresponding weighting units (215A, 215B).

A weighting unit 215 will apply a weight to each element of a wavelet transformation that it receives from a corresponding wavelet transformation unit 205. The weight applied to each element is determined according to the covariance matrix provided by the covariance unit 210. The output of each weighting unit 215 comprises a weighted wavelet transformation. The summation unit 220 performs an element by element summation of all of the weighted wavelet transformations that receives from the plurality of weighting units (215A, 215B). This results in a nulled wavelet transformation 245. The nulled wavelet transformation 245 is then presented to the inverse wavelet transformation unit 250 which then generates a geolocation signal 260 by applying an inverse wavelet transformation to the nulled wavelet transformation it receives from the summation unit 220.

Figure 12:
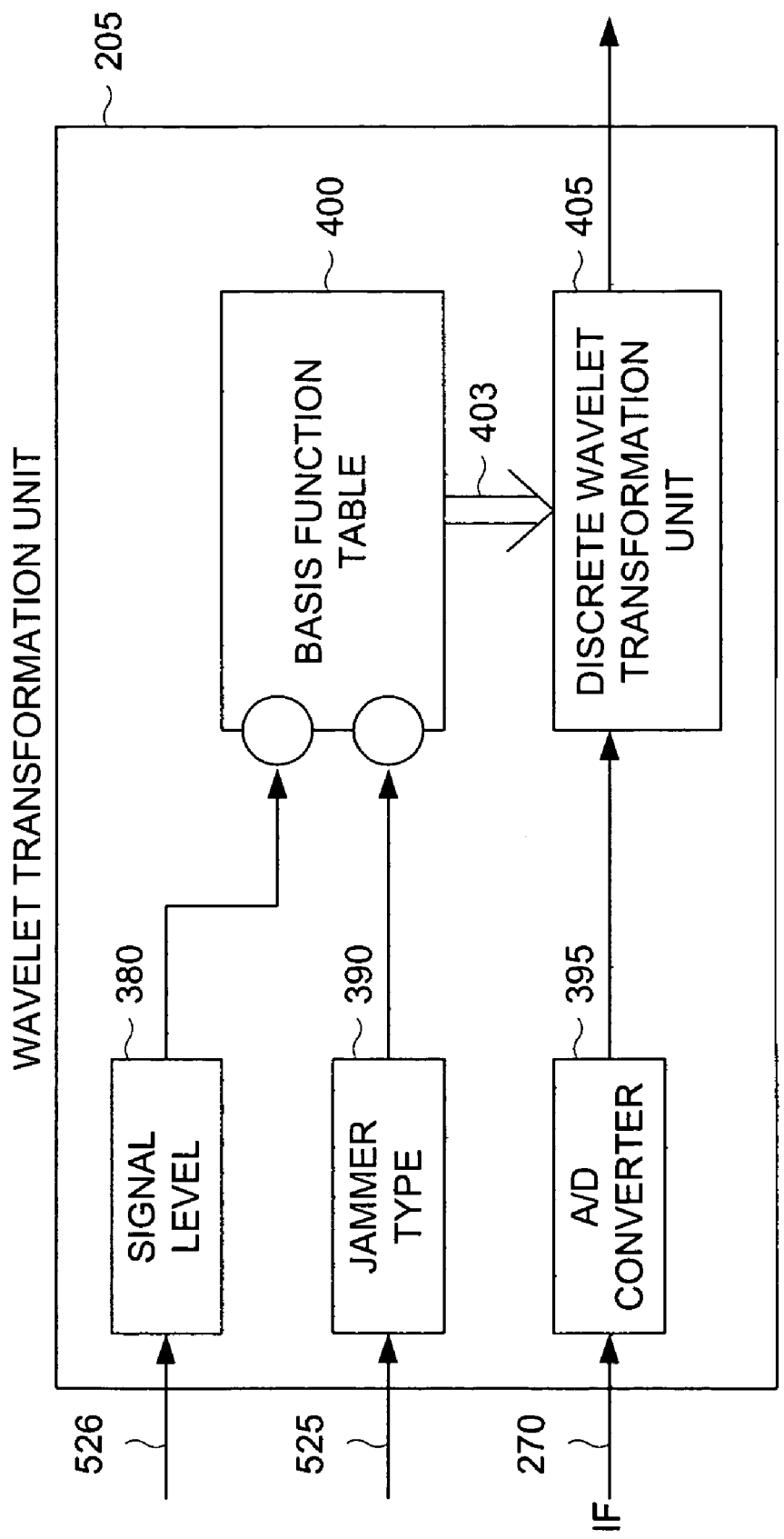
FIG. 12 is a block diagram that depicts one alternative example embodiment of a wavelet transformation unit.

FIG. 12 is a block diagram that depicts one alternative example embodiment of a wavelet transformation unit. According to this alternative example embodiment, a wavelet transformation unit 205 comprises an analog-to-digital (A/D) converter 395. The analog to digital converter 395 receives an intermediate frequency 270 from a corresponding signal receiver 200. The A/D converter 395 converts the received intermediate frequency signal 270 into a sample-set. The sample-set is then provided to a discrete wavelet transformation unit 405, which is also included in this example embodiment of a wavelet transformation unit 205. The discrete wavelet transformation unit 405 receives a basis function 403 from a basis function table 400, which is also included in this example embodiment of a wavelet transformation unit 205.

According to one alternative example embodiment, the wavelet transformation unit 205 further includes a jammer-type register 390. The jammer-type register 390 is used to store a jammer-type indicator which is used, according to this alternative example embodiment, to select a basis function from the basis function table 400. In yet another alternative example embodiment, the wavelet transformation unit 205 further includes a signal level register 380. The signal level register 380 is used to store a residual signal level 526. The value of the signal level register 380 is used in this alternative example embodiment to select a basis function from the basis function table 400. Once selected by a either of a jammer-type indicator stored in the jammer type register 390 or a residual signal level stored in the signal level register 380, a basis function 403 is provided to the discrete wavelet transformation unit 405.

Figure 13:
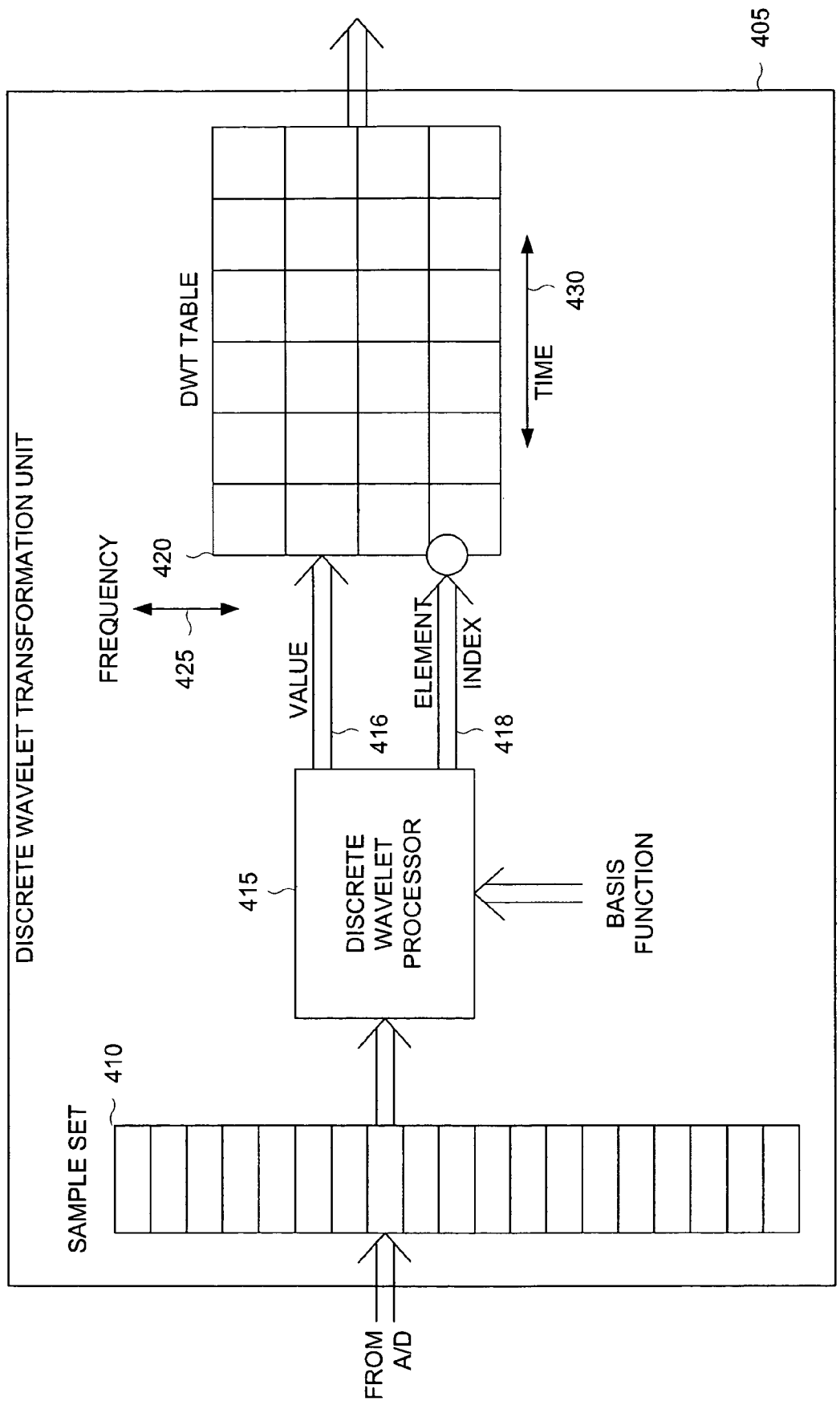
FIG. 13 is a block diagram that depicts one example alternative embodiment of a discrete wavelet transformation unit.

FIG. 13 is a block diagram that depicts one example alternative embodiment of a discrete wavelet transformation unit. According to this example embodiment, the discrete wavelet transformation unit 405 includes a sample set memory 410. The sample-set memory 410 is structured to receive a sample-set from the A/D converter 395. The discrete wavelet transformation unit 405 further includes a discrete wavelet processor 415 which applies a basis function to the sample set in order to create a discrete wavelet transformation (DWT). The discrete wavelet transformation unit of this example embodiment further includes a DWT table 420 (e.g. a memory). It should be appreciated that the DWT table 420 is typically organized as an array having rows and columns. In one example embodiment, various rows in the table are organized to store elements of a discrete wavelet transformation at various frequencies 425. In this example embodiment, various columns in the table are organized to store elements of a discrete wavelet transformation and various time slots 430. In operation, the discrete wavelet processor 415 generates an element value 416 which is stored in the DWT table 420 according to an element index 418. It should be appreciated that the element index 418 includes a frequency index and a time index, which are collectively used to select a particular element (by row and column) in the DWT table 420.

Figure 14:
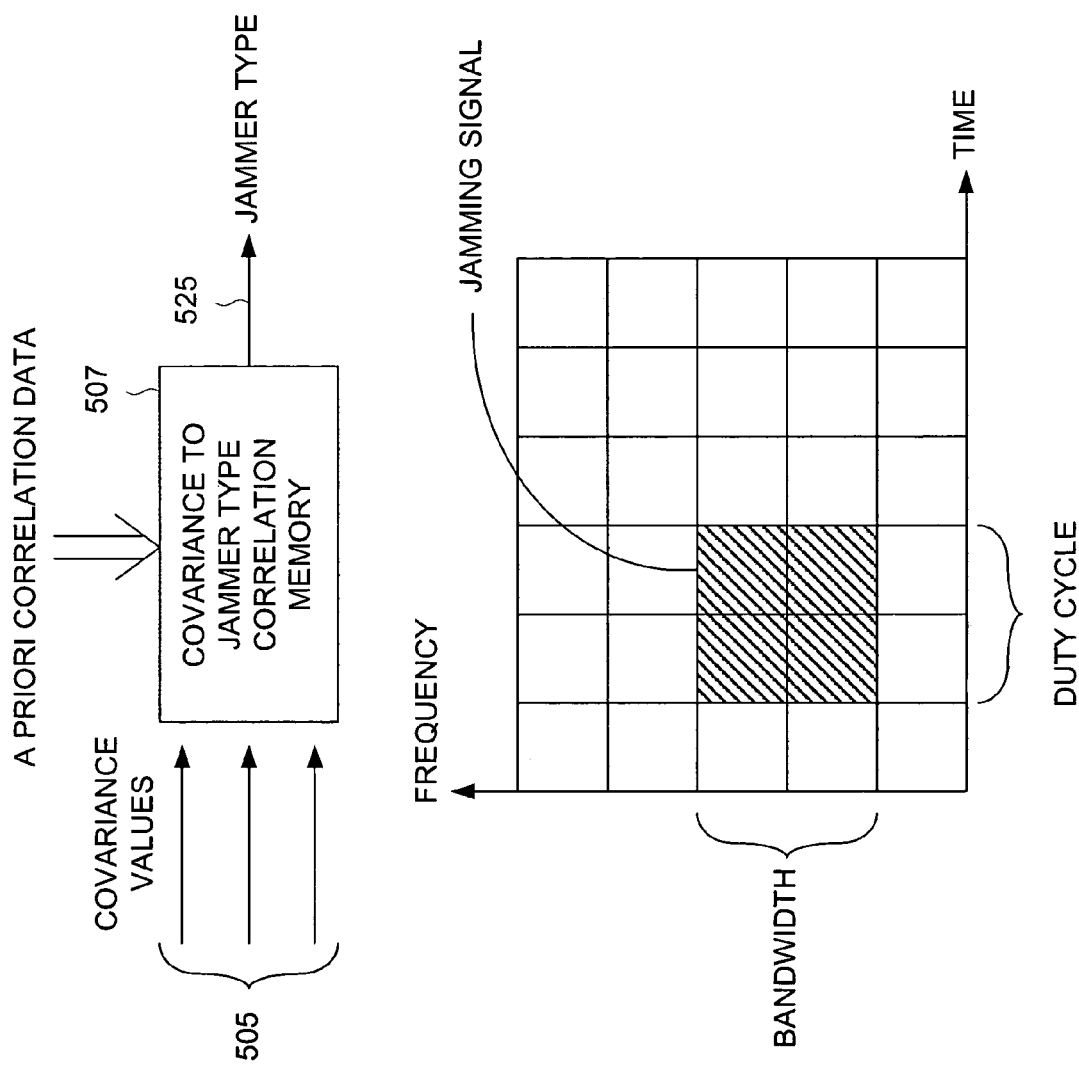
FIG. 14 is a pictorial diagram that depicts one alternative example embodiment of a covariance-to-jammer-type memory.

FIG. 14 is a pictorial diagram that depicts one alternative example embodiment of a covariance-to-jammer-type memory. FIG. 10 further illustrates that one alternative example embodiment of a geolocation system 201 further includes a jammer identification unit 225. The jammer identification unit 225 of this alternative example embodiment includes the covariance-to-jammer-type memory depicted in FIG. 14. It should be appreciated that the covariance-to-jammer-type memory 507 is used to store a correlation of various covariance values 505 to a particular jammer type indicator 525. The jammer type indicator 525 is then provided to the wavelet transformation units 205 included in this example embodiment of geolocation system 201. As further depicted in FIG. 14, one alternative example embodiment of a covariance-to-jammer-type correlation memory is organized as frequency-time bins. In one alternative embodiment, a priori correlation data provides correlation of a particular jammer type in terms of bandwidth. Such correlation identifies a jamming signal based on the number of contiguous frequency bins that exhibit the jamming signal. In yet another alternative embodiment, a priori correlation data provides correlation of a particular jammer type in terms of duty cycle. This type correlation identifies a jamming signal based on the number of contiguous time bins occupied by the jamming signal. Although not meant to limit the scope of the claims appended hereto, the figure illustrates one example where a jamming signal occupies four frequency-time "bins". As such this example would span two "bins" in duty cycle and two "bins" in bandwidth.

Figure 15:
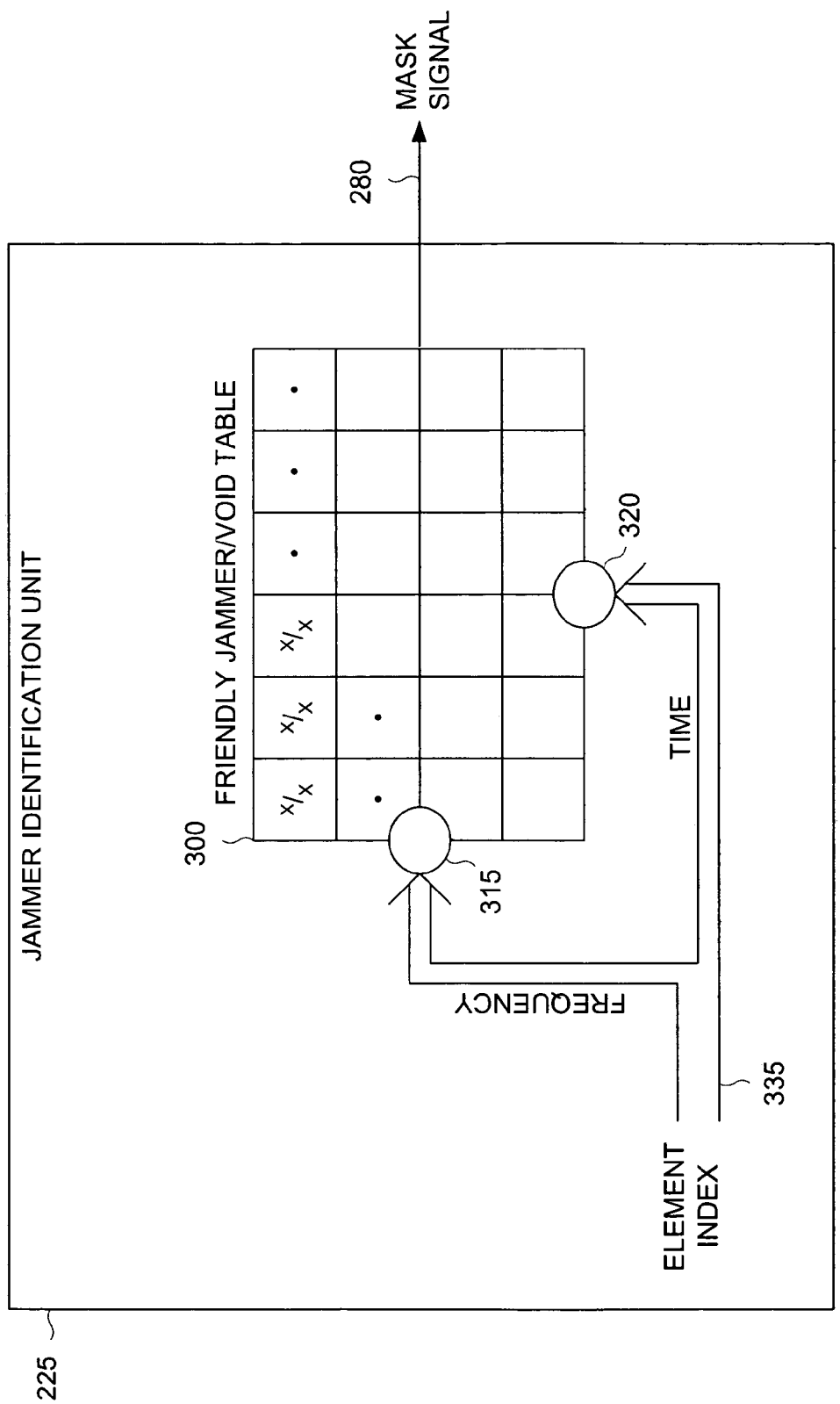
FIG. 15 is a pictorial illustration that depicts one example embodiment of a jammer identification unit structured to identify a friendly jammer or geolocation signal voids.

FIG. 15 is a pictorial illustration that depicts one example embodiment of a jammer identification unit structured to identify a friendly jammer or geolocation signal voids. According to this example embodiment, the jammer identification unit 225 comprises a friendly jammer/void table 300. It should be appreciated that the friendly jammer/void table 300 comprises a memory which is logically organized in rows and columns. In order to identify whether or not a particular jammer is a friendly jammer or a particular element in a discrete wavelet transformation corresponds to a geolocation signal void, this example embodiment of a jammer identification unit 225 receives an element index 335 and generates a mask signal 280 when a particular element, which is selected by an element index 335, has a flag set. It should be appreciated that, according to this example embodiment, the friendly jammer/void table 300 is populated with a priori data that identifies either one or both of friendly jammers and geolocation signal voids. Again, it should be appreciated that a friendly jamming signal is identified when such jamming signal occupies a particular combination of elements both in terms of bandwidth and duty cycle (i.e. contiguous frequency elements and contiguous time elements, respectively).

Figure 16:
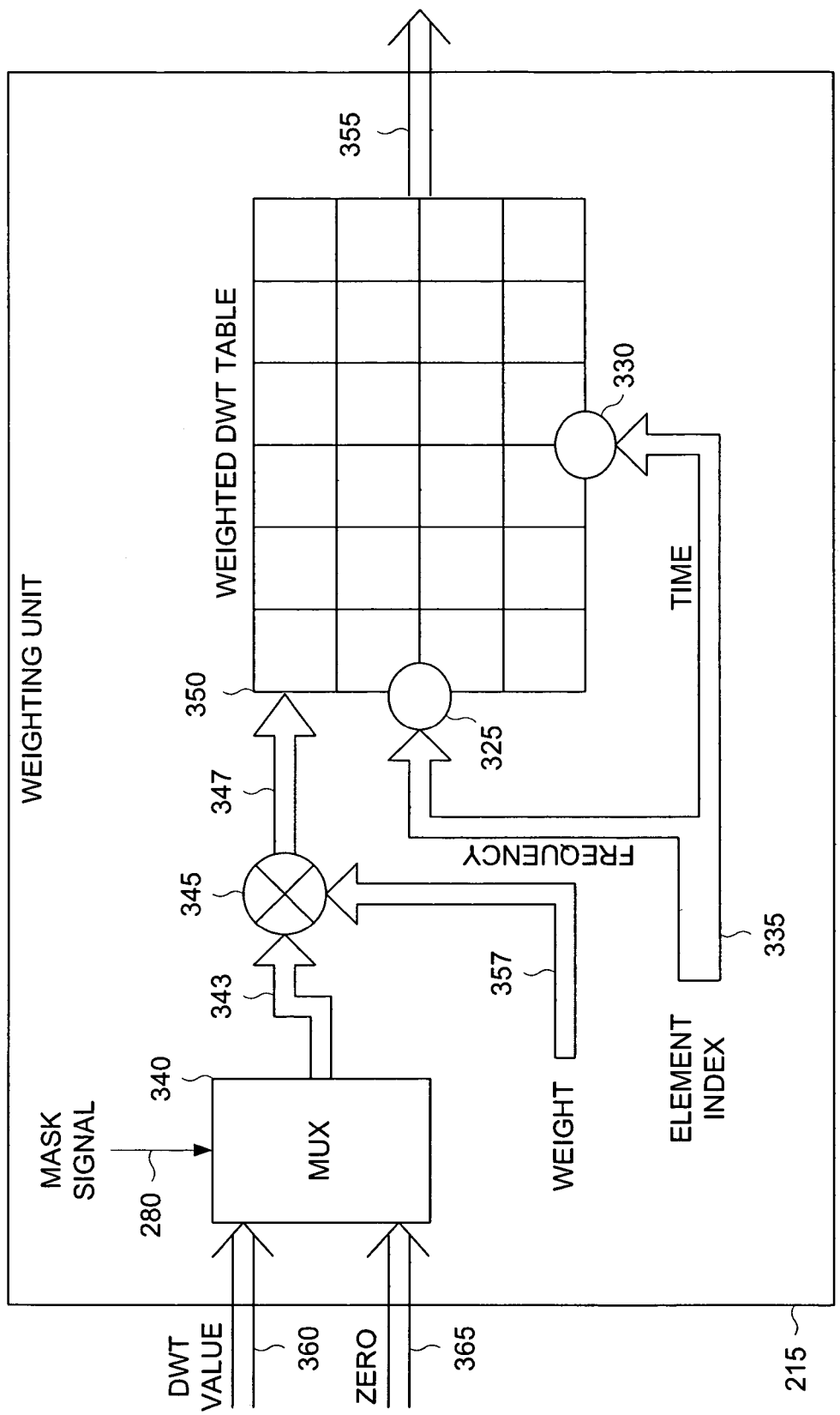
FIG. 16 is a block diagram that depicts one example embodiment of a weighting unit.

FIG. 16 is a block diagram that depicts one example embodiment of a weighting unit. According to this example embodiment, a weighting unit 215 includes a weighted discrete wavelet transformation table 350. The weighted discrete wavelet transformation table 350 includes a plurality of elements which are selected by an element index 335. It should be appreciated that the element index 335 includes a frequency index 325 and a time index 330. Using the element index 335, a value 347 is stored into an element and subsequently retrieved 355 from the weighted discrete wavelet transformation table 350. According to this example embodiment, the weighting unit 215 further includes a multiplier 345. The multiplier 345 receives a discrete wavelet transformation value 343. The value received from the discrete wavelet transformation comprises a value of a particular element of a discrete wavelet transformation, as provided by a wavelet transformation unit 205. It should be appreciated that the value received corresponds to a particular element as identified by the element index 335. The weighting unit 215 multiplies the value 343 of a particular element received from the wavelet transformation unit 205 by a weight 357. It should be appreciated that the weight 357 also corresponds to a particular element as selected by the element index 335. In one alternative example embodiment, the weighting unit 215 further includes a masking multiplexer 340. The masking multiplexer 340 passes either of a discrete wavelet transformation element value 360 received from the wavelet transformation unit 205 or a "zero" value 365. The masking multiplexer 340 selects either of these values according to a mask signal 280 provided by one example embodiment of a jammer identification unit 225, which is fashioned to provide a mask signal 280 when a particular element, as selected by the element index 335, corresponds either to a friendly jammer or to a geolocation signal void. It should be appreciated that a weighted value for a particular element is generated by the multiplier 345 and stored 347 in the weighted DWT table 350 in a particular element as selected by the element index 335.

Figure 17:
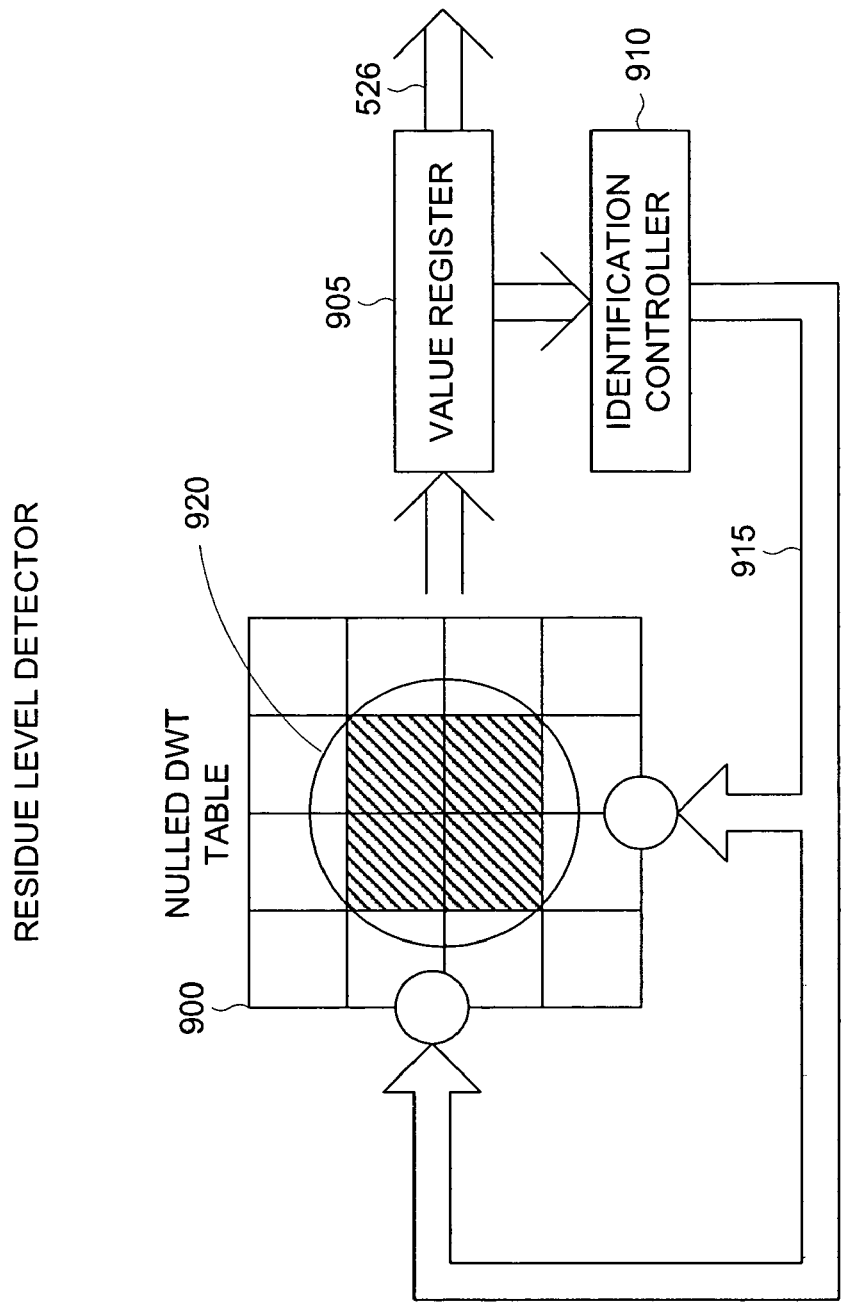
FIG. 17 is a block diagram that depicts one example embodiment of a residual level detector.

FIG. 17 is a block diagram that depicts one example embodiment of a residual level detector. According to this example embodiment, the residual level detector comprises an identification controller 910. The identification controller 910, in operation, generates an element index 915 which is used to select a particular element in a nulled wavelet transformation, which is stored in a nulled wavelet transformation table 900. The identification controller 910 receives values from various elements included in the nulled wavelet transformation table 900 in order to detect a cluster 920 of elements that correspond to a jamming signal. Also included in this example embodiment is a value register 905, which is used to store an average value of the elements included in a detected cluster 920. The output of the value register 526 is in provided to each wavelet transformation unit included in a geolocation system and is used as a residual signal level 526 that is itself used to select a basis function for a subsequent wavelet transformation.

Figure 18:
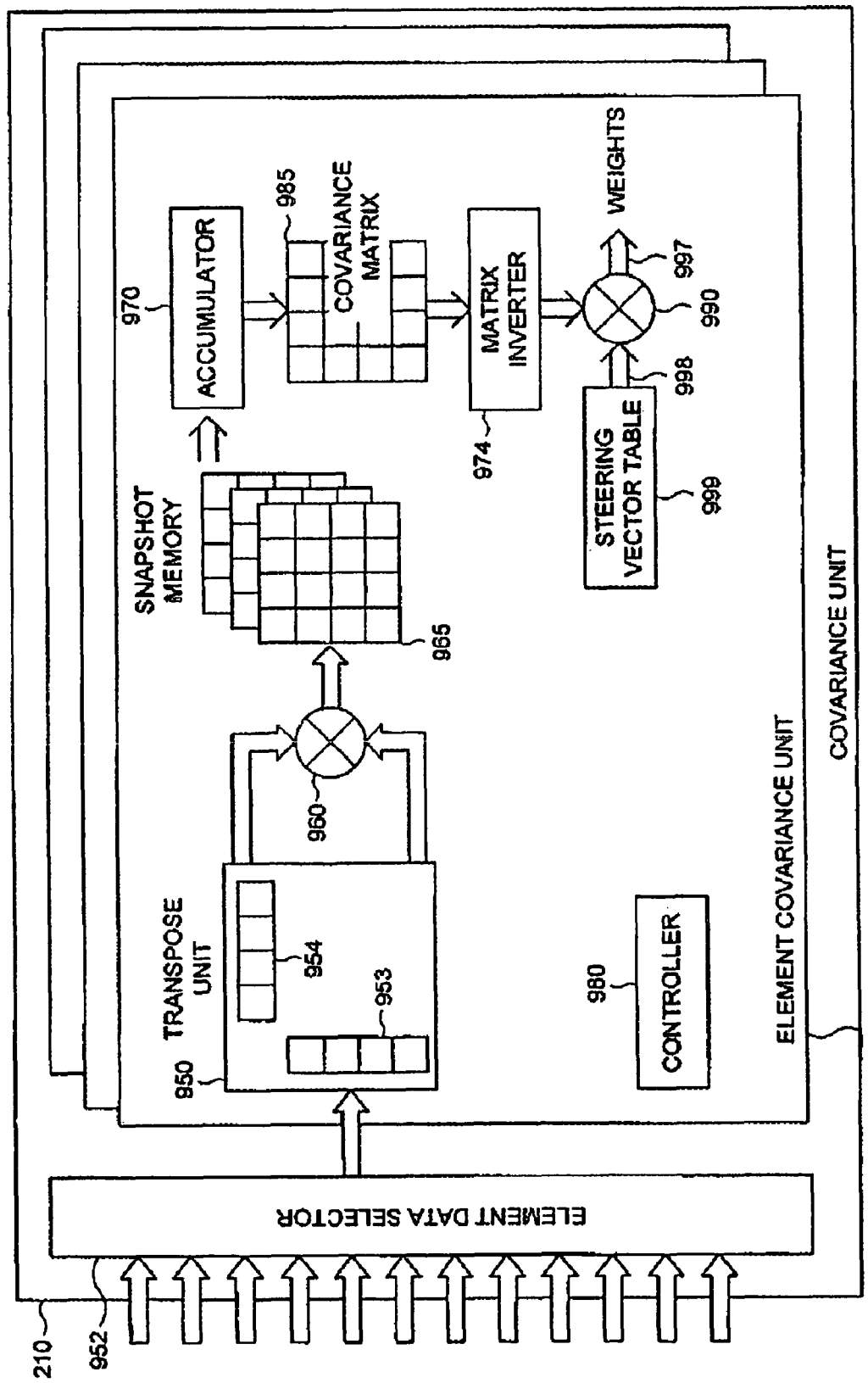
FIG. 18 is a block diagram of one example embodiment of a covariance unit.

FIG. 18 is a block diagram of one example embodiment of a covariance unit. According to this example embodiment, a covariance unit 210 includes a plurality of element-covariance units 951. Each element-covariance unit 951 includes a transpose unit 950. In operation, a transpose unit 950 receives element data from an element included in a discrete wavelet transform and stores this data in a column memory. This example embodiment further includes an element data selector 952 that actually selects data from a set of corresponding elements included in a plurality of discrete wavelet transforms and directs this element data to a transpose unit included in an element covariance unit 951. This data is received by a plurality of input ports, each corresponding to a discrete wavelet transformation unit 205. The transpose unit 950 further includes a transpose memory 954 that holds a transpose of the data stored in the column memory 953. An element-covariance unit 951 further includes a multiplier 960. The multiplier 960 performs a matrix multiplication using the data stored in the column memory 953 and the transpose memory 954 and stores a resulting memory in a snapshot memory 965 included in the element-covariance unit 951. A controller 980 orchestrates this process on a repeated basis over a particular interval of time, resulting in a plurality of snapshots over that interval of time. The element-covariance unit 951 further includes an accumulator 970. The accumulator matrix-sums together each snapshot stored in the snapshot memory 965 on an element by element basis in order to form a covariance matrix 985. The covariance matrix is directed to a matrix inverter 974 which is included in one alternative example embodiment and generates an inverse of the covariance matrix generates by the accumulator 970. In one alternative example embodiment, the element-covariance unit 951 further includes a weighting multiplier 990 which multiplies the resulting inverse of a covariance matrix 985 by a steering vector 998, which is typically stored in a steering vector table 999, resulting in a set of weights which are then provided to the individual weighting units included in a geolocation system. It should be appreciated that the present embodiment is only an illustrative example of a covariance unit and other forms of covariance units are intended to be included in the scope of the claims appended hereto.

Figure 19:
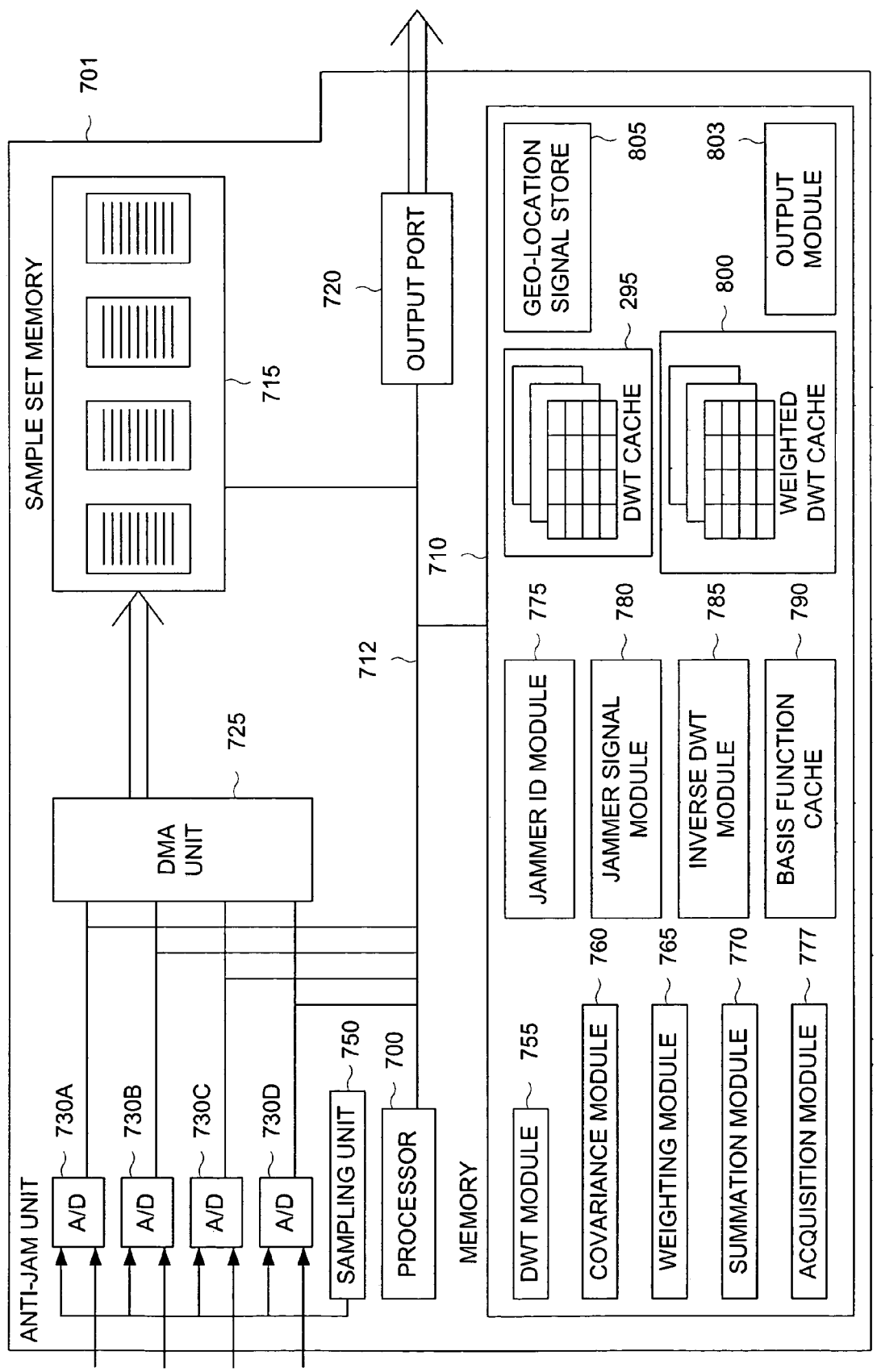
FIG. 19 is a block diagram that depicts one example embodiment of a geolocation anti-jamming unit.

FIG. 19 is a block diagram that depicts one example embodiment of a geolocation anti jamming unit. According to one example embodiment, a geolocation anti jamming unit 701 comprises a plurality of A/D converters 730, one or more processors 700 and a memory 710. In operation, each A/D converter 730 receives a signal and generates a sample-set according to the signal that it receives. It should be appreciated that a signal received by the A/D converters 730 represents time-domain perspective of at least one of a geolocation signal and a jamming signal. The processor 700 is used to execute instruction sequences that are stored in the memory 710. It should be appreciated that the memory is used to store sample-sets, at least according to one alternative embodiment. In yet another alternative embodiment, a separate sample-set memory 715 is included and is used to store sample-sets generated by the A/D converters 730. In this alternative embodiment, the anti jamming unit 701 further includes a direct memory access (DMA) unit 725 and a sampling unit 750. In this alternative embodiment, the sampling unit 750 generates a sampling clock, which is concurrently provided to each A/D converter 730. This enables each A/D converter 730 to capture a signal value at an epoch defined by the sampling clock. This ensures that all sampling-sets are coincident with each other in time. The direct memory access unit 725 organizes individual samples provided by the A/D converters 730 into the sample-set memory 715. The sample-set memory 715 is then accessible by the processor 700 by means of a bus 712. The processor 700 also has access to the memory 710 by means of the bus 712 and to an output port 720, which is used in one alternative embodiment to provide a time-domain rendition of a geolocation signal that results after anti jamming processing has been performed.

Also included in various example alternative embodiments of the system are one or more functional modules. A functional module is typically embodied as an instruction sequence. An instruction sequence that implements a functional module, according to one alternative embodiment, is stored in the memory 710. The reader is advised that the term "minimally causes the processor" and variants thereof is intended to serve as an open-ended enumeration of functions performed by the processor 700 as it executes a particular functional module (i.e. instruction sequence). As such, an embodiment where a particular functional module causes the processor 700 to perform functions in addition to those defined in the appended claims is to be included in the scope of the claims appended hereto.

The functional modules (i.e. their corresponding instruction sequences) described thus far that enable anti jamming processing according to the present method are, according to one alternative embodiment, imparted onto computer readable medium. Examples of such medium include, but are not limited to, random access memory, read-only memory (ROM), compact disk ROM (CD ROM), floppy disks, hard disk drives, magnetic tape and digital versatile disks (DVD). Such computer readable medium, which alone or in combination can constitute a stand-alone product, can be used to convert a general-purpose computing platform into a device capable of performing anti jamming processing according to the techniques and teachings presented herein. Accordingly, the claims appended hereto are to include such computer readable medium imparted with such instruction sequences that enable execution of the present method and all of the teachings herein described.

One example embodiment of a geolocation anti jamming unit 701 further includes a discrete wavelet transform module 755, a covariance module 760, a weighting module 765, a summation module 770 and an inverse discrete wavelet transform module 785. One alternative embodiment of an anti jamming unit 701 further includes an acquisition module 777 that is also stored in the memory 710. Another alternative embodiment further includes a jammer identification module 775. Yet another alternative embodiment further includes a jammer signal module 780. The memory 710, according to various alternative embodiments, is used to store at least one of a basis function cache 790, a discrete weighted transform cache 295 and a weighted discrete wavelet transformation cache 800. In yet another alternative embodiment, an output module 803 is also stored in the memory and included in an anti jamming unit 701. The memory 710 is also used to store a time-domain rendition of a geolocation signal 805.

Figure 20:
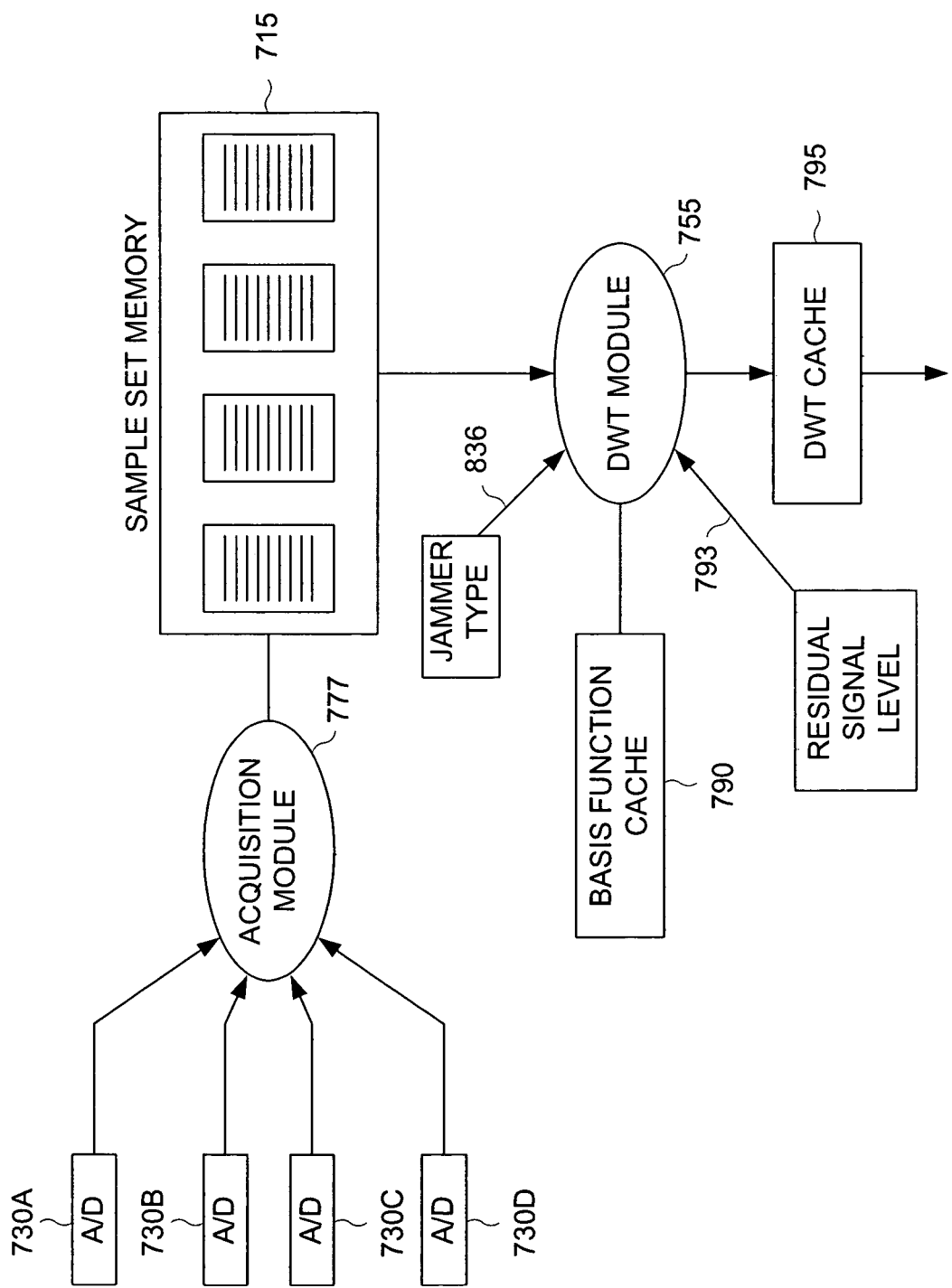
FIG. 20 is a dataflow diagram that depicts the internal operation of alternative example embodiments of an anti jamming unit.

FIG. 20 is a dataflow diagram that depicts the internal operation of alternative example embodiments of an anti-jamming unit. In this alternative example embodiment, the processor 700 executes the acquisition module 777 in order to obtain sample sets from a plurality of A/D converters 730. Accordingly, one example embodiment of an acquisition module 777, when executed by the processor 700, minimally causes the processor to read a sample from a particular A/D converter and to store the value in the sample-set memory 715. The acquisition module 777 further minimally causes the processor to acquire subsequent samples from the first and other A/D converters 730 and to organize samples into sample-sets stored in the sample-set memory 715. In one alternative embodiment, the sample sets are stored in a sample-set memory 715 by the direct memory access unit 725. In this case, the acquisition module 777, when executed by the processor 700, minimally causes the processor to coordinate the transfer of data into the sample-set memory 715 as affected by the direct memory access unit 725. In other words, this alternative embodiment of the acquisition module 777 causes the processor to control the direct memory access controller. Once a plurality of sample-sets is stored in the sample-set memory 715, the processor 700 executes the discrete wavelet transform module 755. The discrete wavelet transform module 755, when executed by the processor 700, minimally causes the processor 700 to create a discrete wavelet transformation according to the sample-set stored in the sample-set memory 715. According to one alternative example embodiment, the discrete wavelet transform module 755 cause the processor to generate a discrete wavelet transformation according to a basis function stored in the basis function cache 790. It should be appreciated that one or more basis functions, according to one illustrative embodiment, are stored in the basis function cache 790. The discrete wavelet transform module 755 cause the processor 700 to store a resulting discrete wavelet transformation in the discrete wavelet transformation cache 795, which is also stored in the memory 710.

Figure 21:
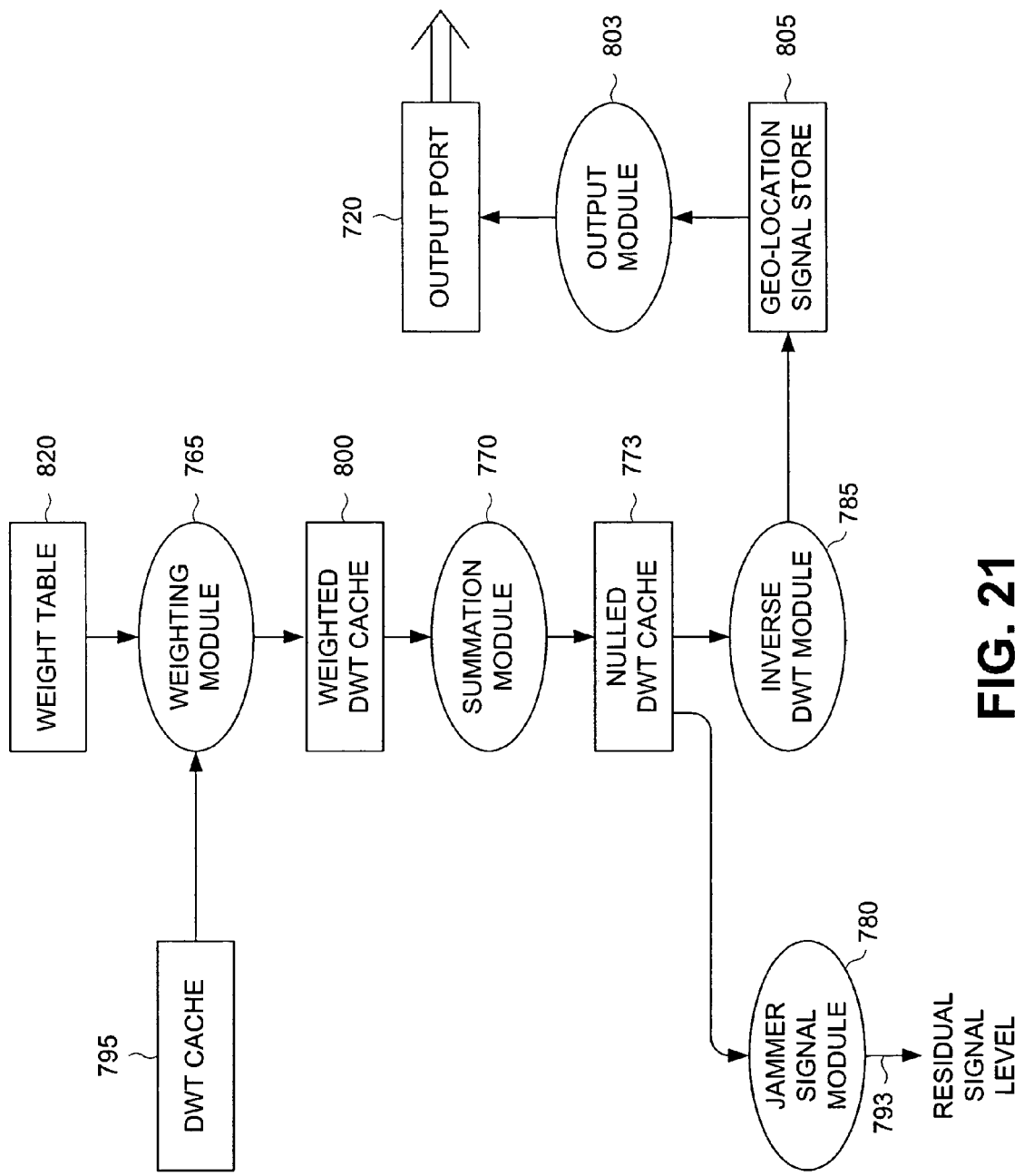
FIG. 21 is a dataflow diagram that depicts a process for weighting a discrete wavelet transformation.

FIG. 21 is a dataflow diagram that depicts a process for weighting a discrete wavelet transformation. According to one example embodiment, the processor 700 executes the weighting module 765. When executed by the processor 700, the weighting module 765 minimally causes the processor to store a weighted wavelet transformation in the weighted discrete wavelet transformation cache 800. In this alternative example embodiment, the weighting module 765 minimally causes the processor to retrieve a discrete wavelet transformation from the discrete wavelet transformation cache 795 and to apply a set of weights, which are typically stored in a weight table 820 in the memory. The result is stored in the weighted discrete wavelet transformation cache 800 as the processor continues to execute the weighting module 765. The processor 700 then executes the summation module 770. When executed by the processor 700, the summation module 770 minimally causes the processor to create a nulled wavelet transformation by summing a plurality of weighted discrete wavelet transformations stored in the weighted discrete wavelet transformation cache 800. The processor stores the nulled discrete wavelet transformation in the memory in a nulled discrete wavelet transformation cache 773.

The processor then executes the inverse discrete wavelet transform module 785 which, when executed by the processor, minimally causes the processor to generate a time-domain rendition of a geolocation signal according to a nulled discrete wavelet transformations stored in the discrete wavelet transformation cache 773. The time-domain rendition of the geolocation signal is stored in a geolocation signal store 805. The processor then executes the output module 803 that, when executed by the processor 700, minimally causes of processor to convey the time-domain rendition of a geolocation signal from the geolocation signal store 805 to the output port 720.

Figure 22:
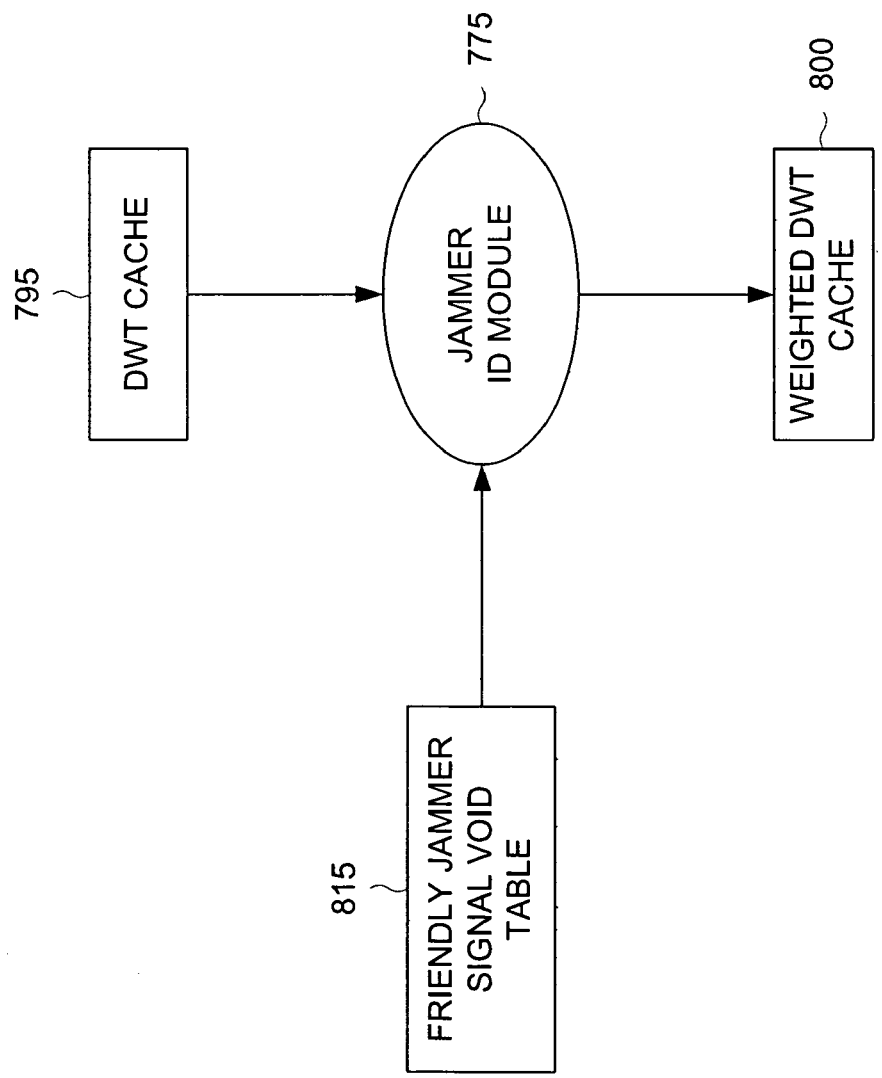
FIG. 22 is a dataflow diagram that depicts one example method for masking friendly jamming signals and geolocation signal voids.

FIG. 22 is a dataflow diagram that depicts one example method for masking friendly jamming signals and geolocation signal voids. According to one example embodiment, the processor 700 executes a jammer identification (ID) module 775, which is also stored in a memory 710. According to this example embodiment, the jammer ID module 775, when executed by the processor 700, minimally causes the processor to create a weighted discrete wavelet transformation in the cache 800 by minimally causing the processor to retrieve individual elements from a discrete wavelet transformation cache 795 stored in the memory 215. The jammer identification module 775 further causes the processor to correlate individual elements in a discrete wavelet transformation with either a friendly jammer or a signal void, either of which may be reflected in a friendly jammer/signal void table 815 located in the memory. It should be appreciated that, according to this alternative example embodiment, a particular element in a resulting weighted discrete wavelet transformation is masked when a correlation with at least one of a friendly jammer or signal void is discovered by the processor 700 as it executes the jammer identification module 775.

Figure 23:
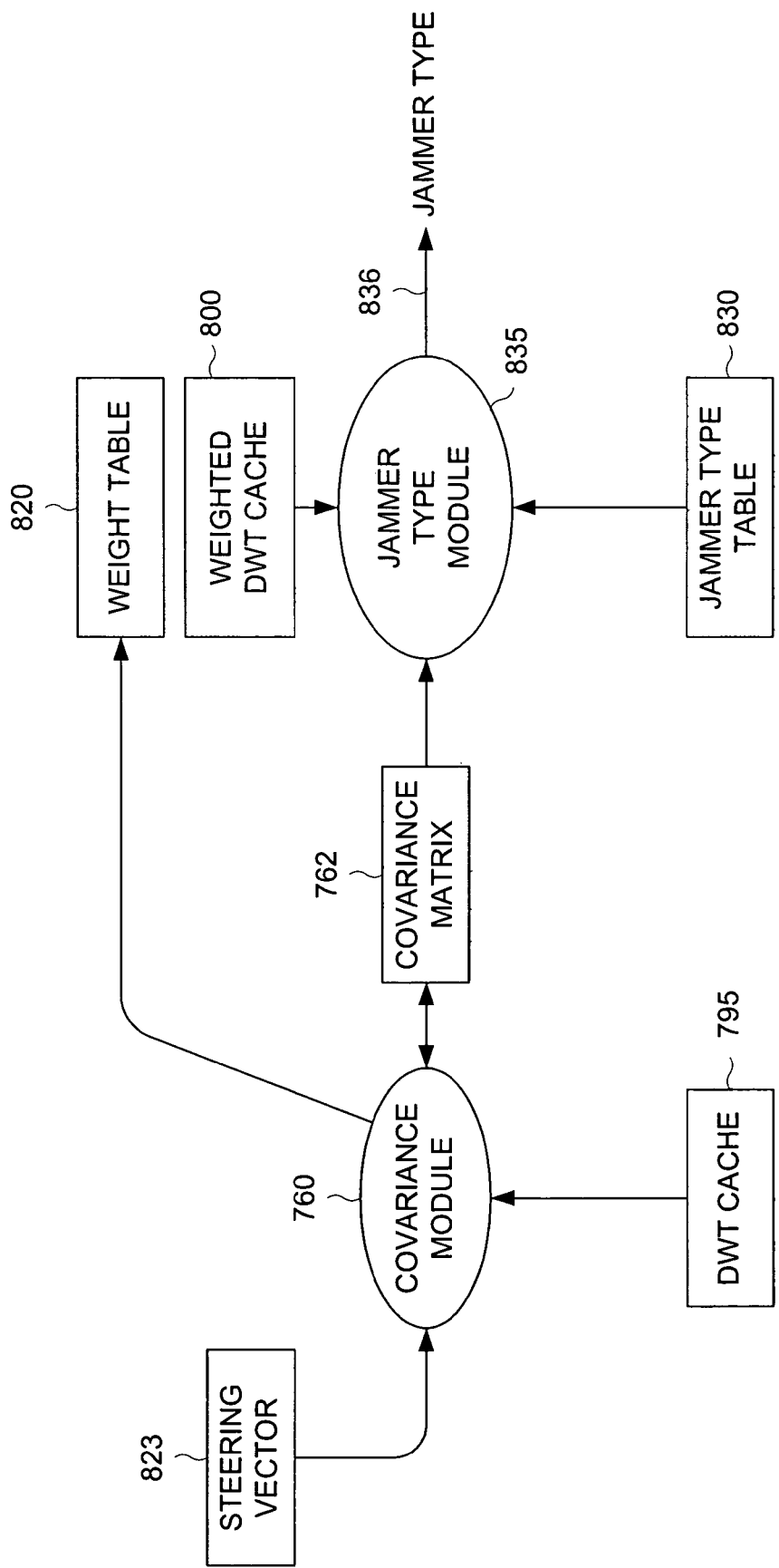
FIG. 23 is a dataflow diagram that depicts one example embodiment wherein the jammer is identified and such identification is used to further refine anti jam processing.

FIG. 23 is a dataflow diagram that depicts one example embodiment wherein the jammer is identified and such identification is used to further refine anti jam processing. In this alternative example embodiment, an anti jamming unit further comprises a jammer type module 835. The jammer type module 835, when executed by the processor 700, minimally causes processor to generate a jammer type identifier 836. According to this example embodiment, the processor 700 generates a jammer type identifier 836 according to a covariance matrix 762 stored in the memory 710. Based on the covariance matrix 762, the jammer type module 835, when executed by the processor 700, causes the processor to correlate a particular covariance pattern with that of one or more known jammer type covariance patterns, which, according to this alternative embodiment, are stored in a jammer type table 832 maintained in the memory 710. FIG. 20 further illustrates that, according to this alternative example embodiment, the discrete wavelet transform module 755, when executed by the processor 700, causes the processor to select a basis function according to the jammer type indicator 836. It should be appreciated that the jammer type indicator 836 is typically stored in the memory 710 as the processor executes the jammer type module 835. The processor then creates and stores in the memory a wavelet transformation of according to a sample set stored in the memory and according to a basis function selected according to the jammer type indicator 836.

FIG. 23 further illustrates that, according to one alternative example embodiment, the jammer type module 835, when executed by the processor, minimally causes the processor to identify a jammer according to at least one of a bandwidth and a duty cycle of a signal represented in a weighted discrete wavelet transformation stored in the weighted discrete wavelet transformation cache 800. In this example embodiment, the jammer type table 830 is used to store representations of known jamming sources, wherein such representations represent at least one of a bandwidth and a duty cycle for one or more known jamming sources. In this example embodiment, the jammer type module 835 causes the processor 700 to correlate one or more known jamming sources with a bandwidth or a duty cycle of a signal represented in a weighted discrete wavelet transformation. The processor 700, as it continues to execute this alternative example embodiment of a jammer type module 835, classifies a signal represented in a weighted discrete wavelet transformation by creating a jammer type identifier 836. FIG. 20 further illustrates that, according to this alternative example embodiment, the discrete wavelet transform module 755, when executed by the processor 700, causes the processor to select a basis function according to the jammer type indicator 836. It should be appreciated that the jammer type indicator 836 is typically stored in the memory 710 as the processor executes the jammer type module 835. The processor then creates and stores in the memory a wavelet transformation of according to a sample set stored in the memory and according to a basis function selected according to the jammer type indicator 836.

FIG. 21 further illustrates that, according to one alternative example embodiment, an anti jamming unit 701 further includes a jammer signal module 780. According to this alternative example embodiment, the jammer signal module 780, when executed by the processor 700, minimally causes the processor to generate a residual signal level indicator 793 according to a nulled discrete wavelet transformation stored in the nulled discrete wavelet transformation cache 773. According to this alternative example embodiment, the residual signal level indicator 793, as further illustrated in FIG. 20, is used by the processor 700 as it executes the discrete wavelet transform module 755. In this alternative example embodiment, the discrete wavelet transform module 755, when executed by the processor 700, minimally causes the processor to select a basis function from the basis function cache 790 according to the residual signal level indicator 793. The discrete wavelet transform module of this alternative example embodiment causes the processor to generate a discrete wavelet transformation according to a sample set stored in the sample set memory 715 and according to a basis function selected according to the residual signal level indicator 793. The processor then stores the generated discrete wavelet transformation in the discrete wavelet transformation cache 795.

FIG. 23 also illustrates that, according to one alternative example embodiment, the processor 700 also executes the covariance module 760. When executed by the processor, the covariance module 760 minimally causes the processor to generate a covariance matrix 762 according to a plurality of discrete wavelet transformations stored in the discrete wavelet transformation cache 795. It should be appreciated that the covariance module 760 causes the processor to generate a covariance matrix according to the techniques and teachings herein presented. The covariance module 760 further minimally causes the processor to generate a set of weights, which are stored in the weight table 820, by minimally causing the processor to applying a steering vector 823 to a generated covariance matrix 762. It should be appreciated that the covariance matrix 762 and the steering vector 823 are stored in the memory 210.

While the present method and apparatus have been described in terms of several alternative methods and embodiments, it is contemplated that alternatives, modifications, permutations and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method for receiving geolocation signals:
   simultaneously receiving a plurality of perspectives of a geolocation signal and a jamming signal;
   generating a plurality of wavelet transformations corresponding to the plurality of perspectives;
   determining a covariance between corresponding elements in the plurality of wavelet transformations;
   weighting each element in each wavelet transformation by weights derived from the determined covariance;
   generating a nulled wavelet transformation by summing together corresponding weighted elements from each of the plurality of wavelet transformations; and
   generating a time-domain rendition of the geolocation signal according to the nulled wavelet transformation through use of the inverse wavelet transform.

2. The method of claim 1 wherein generating a plurality of wavelet transformations comprises:
   collecting a sample set for each perspective of the geolocation signal and the jamming signal; and
   applying a discrete wavelet transformation function to each sample set.

3. The method of claim 1 wherein generating a plurality of wavelet transformations comprises:
   selecting a basis function according to an anticipated jamming signal type;
   collecting a sample set for each perspective of the geolocation signal and the jamming signal; and
   applying a discrete wavelet transformation utilizing the basis function to each sample set.

4. The method of claim 1 wherein weighting each element in each wavelet transformation comprises masking an element in a wavelet transformation when the element in the wavelet transformation corresponds to at least one of a friendly jammer or a geolocation signal void.

5. The method of claim 1 further comprising:
   characterizing the jamming signal according to the determined covariance;
   selecting a basis function used in a subsequent wavelet transformation according to the characterization of the jamming signal.

6. The method of claim 5 wherein characterizing the jamming signal comprises determining at least one of a duty cycle and a bandwidth.

7. The method of claim 1 further comprising:
   determining a residual level of the jamming signal represented in the nulled wavelet transformation; and
   selecting a basis function used in a subsequent wavelet transformation according to the residual level of the jamming signal represented in the nulled wavelet transformation.

8. A geolocation system comprising:
   plurality of signal receivers each configured for simultaneously generating a signal according to a received perspective of a geolocation signal and a jamming signal;
   plurality of wavelet transformation units each generating a wavelet transformation according to a signal received from a corresponding signal receiver;
   covariance unit that generates a covariance signal for each element in each wavelet transformation generated by the plurality of wavelet transformation units;
   plurality of weighting units each of which applies a weight to a wavelet transformation received from a corresponding wavelet transformation unit wherein the weight applied is determined according to a covariance signal received from the covariance unit;
   summation unit that generates a nulled wavelet transformation by adding the outputs from each of the weighting units; and
   inverse wavelet transformation unit that generates a geolocation signal according to the output of the summation unit.

9. The geolocation system of claim 8 wherein the wavelet transformation unit comprises:
   analog to digital converter that converts a signal received from a corresponding signal receiver into a sample-set;
   basis function table capable of storing at least one basis function; and
   discrete wavelet transformation unit that generates a discrete wavelet transformation comprising a plurality of elements according to the sample set according to a basis function provided by the basis function table.

10. The geolocation system of claim 9 wherein the wavelet transformation unit further comprises a jammer-type register capable of storing a jammer-type indicator for a jamming signal wherein the basis function table provides a basis function according to a jammer-type indicator stored in the jammer-type register.

11. The geolocation system of claim 10 further comprising a jammer-type correlation memory capable of generating a jammer-type indicator according to a plurality of covariances generated for a plurality of corresponding elements in a plurality of discrete wavelet transformations and wherein the jammer-type indicator is stored in the jammer-type register.

12. The geolocation system of claim 11 wherein the jammer-type correlation memory is used to store a jammer profile that is based on at least one of bandwidth of the jamming signal and duty cycle of the jamming signal.

13. The geolocation system of claim 9 further comprising a friendly jammer identification unit that generates a mask signal for an element of a discrete wavelet transform when the element corresponds to at least one of a friendly jammer and a geolocation signal void.

14. The geolocation system of claim 9 further comprising a jammer-residual signal monitor that generates a residual-signal-level for the jamming signal according to the output of the summation unit and wherein each wavelet transformation unit further comprises a residual-signal-level input and wherein the basis function table provides a basis function according to the residual-signal-level signal.

15. A geolocation anti-jamming unit comprising:
   plurality of analog-to-digital converters each configured for simultaneously capturing a sample-set of a perspective of a geolocation signal and a jamming signal;
   processor capable of executing an instruction sequence;
   memory for storing at least one of one or more instruction sequences, a sample set captured by one of the analog-to-digital converters and other data;
   one or more instruction sequences stored in the memory including:
      discrete wavelet transform module that, when executed by the processor, minimally causes the processor to create and store in the memory a wavelet transformation according to a sample-set stored in the memory;
      covariance module that, when executed by the processor, minimally causes the processor to create and store in the memory a set of weights based on a covariance matrix generated according to a plurality of wavelet transformations stored in the memory;
      weighting module that, when executed by the processor, minimally causes the processor to create and store in the memory a weighted wavelet transformation according to the weights stored in the memory when the processor executes the covariance module;
      summation module that, when executed by the processor, minimally causes the processor to create and store in the memory a nulled wavelet transformation according to a plurality of weighted wavelet transformation stored in the memory; and
      inverse discrete wavelet transform module that, when executed by the processor, minimally causes the processor to create and store in the memory a time-domain rendition of a geolocation signal according to a nulled wavelet transformation stored in the memory.

16. The geolocation anti-jamming unit of claim 15 further comprising a basis function cache stored in the memory that includes one or more basis function definitions and wherein the discrete wavelet transformation module minimally causes the processor to create and store in the memory a wavelet transformation according to a sample-set stored in the memory and also according to a basis function stored in the basis function cache.

17. The geolocation anti-jamming unit of claim 15 further comprising a friendly jammer identification module stored in the memory that, when executed by the processor, minimally causes the processor to create and store in the memory a weighted wavelet transformation by masking an element included in a wavelet transformation stored in the memory when the element corresponds to at least one of a friendly jammer and a geolocation signal void.

18. The geolocation anti-jamming unit of claim 15 further comprising a jammer type module that, when executed by the processor, minimally causes the processor to create and store in the memory a jammer type identifier according to a covariance matrix stored in the memory and wherein the discrete wavelet transformation module causes the processor to create and store in the memory a wavelet transformation according to a sample-set stored in the memory and according to a basis function selected according to the jammer type identifier.

19. The geolocation anti-jamming unit of claim 15 further comprising a jammer type module that, when executed by the processor, minimally causes the processor to create and store in the memory a jammer type identifier according to at least one of a bandwidth and a duty cycle of a signal represented in a weighted discrete wavelet transform stored in the memory and wherein the discrete wavelet transformation module causes the processor to create and store in the memory a wavelet transformation according to the sample-set stored in the memory and according to a basis function selected according to the jammer type identifier.

20. The geolocation anti-jamming unit of claim 15 further comprising a jamming signal residual signal module that, when executed by the processor, minimally causes the processor to create and store in the memory a signal level indicator for the jamming signal represented in a weighted discrete wavelet transform stored in the memory and wherein the discrete wavelet transformation module causes the processor to create and store in the memory a wavelet transformation according to the sample-set stored in the memory and according to a basis function selected according to the signal level indicator.

* * * * *